(12) United States Patent
Chandan et al.

(10) Patent No.: US 11,171,599 B2
(45) Date of Patent: *Nov. 9, 2021

(54) TUNABLE PHOTONIC HARVESTING FOR SOLAR ENERGY CONVERSION AND DYNAMIC SHADING TOLERANCE

(71) Applicant: International Business Machines Corporation, Armonk, NY (US)

(72) Inventors: Vikas Chandan, Bangalore (IN); Shivkumar Kalyanaraman, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 16/447,492

(22) Filed: Jun. 20, 2019

(65) Prior Publication Data

US 2019/0305721 A1 Oct. 3, 2019

Related U.S. Application Data

(62) Division of application No. 14/815,483, filed on Jul. 31, 2015, now Pat. No. 10,454,412.

(51) Int. Cl.
*H01L 31/042* (2014.01)
*H02S 40/22* (2014.01)
(Continued)

(52) U.S. Cl.
CPC .............. *H02S 40/22* (2014.12); *H02S 40/44* (2014.12); *H02S 50/00* (2013.01); *Y02E 10/52* (2013.01); *Y02E 10/60* (2013.01)

(58) Field of Classification Search
CPC .......... H02S 40/22; H02S 40/44; H02S 50/00; Y02E 10/52; Y02E 10/60
See application file for complete search history.

(56) References Cited

U.S. PATENT DOCUMENTS 2,294,930 A * 9/1942 Palmquist .............. G02B 5/128
359/538
2,555,715 A * 6/1951 Tatum .................... G02B 5/128
359/540
(Continued)

FOREIGN PATENT DOCUMENTS

DE 102008009477 A1 8/2008
IN 2956CHE2012 A 4/2016
(Continued)

OTHER PUBLICATIONS

Moharram et al., Enhancing the Performance of Photovoltaic Panels by Water Cooling. Ain Shams Engineering Journal 4. No. 4 (2013): 869-877.

(Continued)

*Primary Examiner* — Thanh Trug Trinh
(74) *Attorney, Agent, or Firm* — Ryan, Mason & Lewis, LLP

(57) ABSTRACT

Methods, apparatus and systems for tunable photonic harvesting for solar energy conversion and dynamic shading tolerance are provided herein. An apparatus includes a solar photovoltaic module; a sensor device operative to determine portions of the solar photovoltaic module that are underperforming in relation to separate portions; reflective surfaces of a first type, each physically connected to the solar photovoltaic module at a given angle in relation to the surface of the solar photovoltaic module; and reflective surfaces of a second type, each physically connected to a respective one of the reflective surfaces of the first type; wherein the reflective surfaces of the first type and second type are configurable based on a determination of the underperforming portions of the solar photovoltaic module to collect and distributed direct solar radiation and diffuse (Continued)

solar radiation across the solar photovoltaic module to offset the underperforming portions by a given amount.

10 Claims, 29 Drawing Sheets

(51) Int. Cl.
*H02S 50/00* (2014.01)
*H02S 40/44* (2014.01)

(56) References Cited

U.S. PATENT DOCUMENTS

| | | | |
|---|---|---|---|
| 4,395,581 A * | 7/1983 | Girard | H01L 31/0547 359/853 |
| 5,108,218 A | 4/1992 | Wyckoff | |
| 6,017,002 A | 1/2000 | Burke | |
| 8,655,497 B2 | 2/2014 | Campanile et al. | |
| 2004/0025931 A1 | 2/2004 | Aguglia | |
| 2009/0025780 A1* | 1/2009 | Nakata | H01L 33/20 136/250 |
| 2009/0151769 A1* | 6/2009 | Corbin | F24S 23/77 136/246 |
| 2009/0283135 A1 | 11/2009 | Neeb | |
| 2010/0057267 A1 | 3/2010 | Liu | |
| 2010/0170561 A1 | 7/2010 | Peng | |
| 2011/0197943 A1 | 8/2011 | Pleva | |
| 2012/0160234 A1 | 6/2012 | Wares | |
| 2012/0325288 A1 | 12/2012 | Jang | |
| 2013/0328090 A1 | 12/2013 | Park | |
| 2014/0094980 A1 | 4/2014 | Saito | |
| 2014/0238465 A1 | 8/2014 | Kost | |
| 2014/0260000 A1 | 9/2014 | Haynes et al. | |
| 2014/0373900 A1 | 12/2014 | Lamkin et al. | |
| 2015/0027511 A1 | 1/2015 | Jang | |
| 2015/0155414 A1 | 6/2015 | Bedell | |
| 2016/0056320 A1 | 2/2016 | Chang | |
| 2016/0087132 A1 | 3/2016 | Alteneiji | |

FOREIGN PATENT DOCUMENTS

| | | |
|---|---|---|
| WO | 2010003115 A1 | 7/2010 |
| WO | 2015122891 A1 | 8/2015 |

OTHER PUBLICATIONS

Wikipedia, Reflectance, https://en.wikipedia.org/wiki/Reflectance, 2015.
Nalamwar, A., Nespal Air Water Heater, Mar. 1, 2015.
Zhu et al., Stress-dependent molecular pathways of silica-water reaction, Journal of the Mechanics and Physics of solids, 53 (2005) 1597-1623.
Lin. Non-Tracked Mirror-Augmented Photovoltaic Design and Performance. Case Western University, Department of Material Science and Engineering. Dec. 2012.
Wikipedia, Concentrator Photovoltaics, Oct. 5, 2016, pp. 1-11. http://en.wikipedia.org/wiki/Concentrated_photovoltaics#Concentrated_photovoltaics_and_thermal.
Wikipedia, Diffuse Reflection, Oct. 5, 2016, pp. 1-4, http://en.wikipedia.org/wiki/Diffuse_reflection.
Wikipedia, Optical Coating, Oct. 5, 2016, pp. 1-5, http://en.wikipedia.org/wiki/Optical_coating.
Wikipedia, Perfect Mirror, Oct. 5, 2016, pp. 1-2, http://en.wikipedia.org/wiki/Perfect_mirror.
Armstrong et al. A Thermal Model for Pothovoltaic Panels Under Varying Atmospheric Conditions, Applied Thermal Engineering 30 (2010) 1488-1495, www.nuigalway.ie/power_electronics/documents/applied_thermal_engineering_2010.pdf.
Woodford, Heat-Reflecting Low-E Glass, Jul. 10, 2016, pp. 1-10, http://www.explainthatstuff.com/how-low-e-heat-reflective-windows=work.html.
KentOptronics, Liquid Crystal for Photonic, Switchable Mirror, Switchable Glass, pp. 1-2, Oct. 5, 2016, http://www.kentoptronics.com/mirror.html.
Wikipedia, Light Tube, Oct. 5, 2015, pp. 1-8, http://en.wikipedia.org/wiki/Light_tube.
Orientation & Zoning of Buildings to Reduce Solar Gain: Rio de Janeiro, Oct. 5, 2016, pp. 1-5, http://www.riorenewables.com/efficient-design/orientation-zoning.
Karami et al. (2014). Heat transfer enhancement in a hybrid microchannel-photovoltaic cell using Boehmite nanofluid. International Communications in Heat and Mass Transfer, 55, 45-52.
Hosseini et al. (May 2011). An experimental study of combining a photovoltaic system with a heating system. In World renewable Energy Congress Sweden (pp. 8-13).
Hollick et al. (2007). PV thermal systems capturing the untapped energy. In Proceedings of the Solar Conference (vol. 1, p. 285). American Solar Energy Society; american institute of architects.
PlanetEnergy.co.uk, Sales Inquiry, 2015, pp. 1, http://www.planetenergy.co.uk/Solar%20Vacuum%20v%20Flat%20Collector%20Comparison.pdf.
Solar Radiation Control Coatings Tested on ORNL User Center, Sep. 9, 1996, pp. 1-3, http://web.oml.gov/sci/roofs+walls/facts/SolarRadiationControl.htm.
Wikipedia, Concentrator Photovoltaics, Oct. 5, 2016, pp. 1-11, http://en.wikipedia.org/wiki/Concentrated_photovoltaics.
How to Boost and Solar Panel Output by 75%, 2014, pp. 1-20, http://goe-dome.co.uk/article.asp?uname=solar mirror.

* cited by examiner

TUNABLE PHOTONIC HARVESTING FOR SOLAR ENERGY CONVERSION AND DYNAMIC SHADING TOLERANCE

FIELD

The present application generally relates to information technology, and, more particularly, to solar energy management techniques.

BACKGROUND

Solar energy system output and efficiency face numerous challenges, such as, for example, shadowing and soiling complications. Shadowing of solar panels (by trees, other buildings, poles, etc.) causes non-linear reduction in output both at a panel level and a string level. Soiling can include the formation and/or deposition of dust and other particulates and/or small debris on solar panels. Energy loss and cleaning costs associated with soiling can be expensive and reduce efficiency of solar panels and/or systems.

SUMMARY

In one aspect of the present invention, techniques for tunable photonic harvesting for solar energy conversion and dynamic shading tolerance are provided. An exemplary method can include determining one or more of multiple portions of a solar photovoltaic module that are underperforming in relation to one or more separate portions of the solar photovoltaic module, wherein the determining is carried out by a sensor device associated with the solar photovoltaic module. The method can also include configuring multiple reflective surfaces to produce a given configuration of the multiple reflective surfaces in relation to a surface of the solar photovoltaic module, wherein the configuring is carried out based on the determining the one or more underperforming portions of the solar photovoltaic module. Additionally, the method can also include collecting (i) direct solar radiation and (ii) diffuse solar radiation incident on a plurality of the multiple reflective surfaces; and distributing (i) the collected direct solar radiation and (ii) the collected diffuse solar radiation across the multiple portions of the solar photovoltaic module in a targeted manner based on the given configuration of the multiple reflective surfaces to offset the one or more underperforming portions of the solar photovoltaic module by a given amount, wherein the distributing comprises reflecting (i) the collected direct solar radiation and (ii) the collected diffuse solar radiation off of one or more of the multiple reflective surfaces to the multiple portions of the solar photovoltaic module of the solar photovoltaic module in accordance with the given configuration of the multiple reflective surfaces.

In another aspect of the invention, an apparatus can include a solar photovoltaic module, and a sensor device operative to determine one or more of multiple portions of the solar photovoltaic module that are underperforming in relation to one or more separate portions of the solar photovoltaic module. The apparatus can also include one or more reflective surfaces of a first type, wherein each respective one of the one or more reflective surfaces of the first type is physically connected to the solar photovoltaic module at a given angle in relation to the surface of the solar photovoltaic module; and one or more reflective surfaces of a second type, wherein each respective one of the one or more reflective surfaces of the second type is physically connected to a respective one of the one or more reflective surfaces of the first type; wherein (i) the one or more reflective surfaces of the first type and (ii) the one or more reflective surfaces of the second type are configurable based on a determination of the one or more underperforming portions of the solar photovoltaic module to: collect direct solar radiation and diffuse solar radiation; and distribute the collected direct solar radiation and the collected diffuse solar radiation across the multiple portions of the solar photovoltaic module in a targeted manner to offset the one or more underperforming portions of the solar photovoltaic module by a given amount.

In yet another aspect of the invention a system can include a solar photovoltaic module; and a sensor device operative to determine one or more of multiple portions of the solar photovoltaic module that are underperforming in relation to one or more separate portions of the solar photovoltaic module. The system can also include a plurality of configurable reflective surfaces, wherein: each respective one of the plurality of configurable reflective surfaces is physically connected to the solar photovoltaic module at a given angle in relation to the surface of the solar photovoltaic module; and each respective one of the plurality of configurable reflective surfaces is configurable based on a determination of the one or more underperforming portions of the solar photovoltaic module to (i) collect direct solar radiation and diffuse solar radiation and (ii) distribute the collected direct solar radiation and the collected diffuse solar radiation across the multiple portions of the solar photovoltaic module in a targeted manner to offset the one or more underperforming portions of the solar photovoltaic module by a given amount. The system can also include a heat transfer mechanism coupled to the solar photovoltaic module and operative to reduce the temperature of the solar photovoltaic module.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

Figure 11:
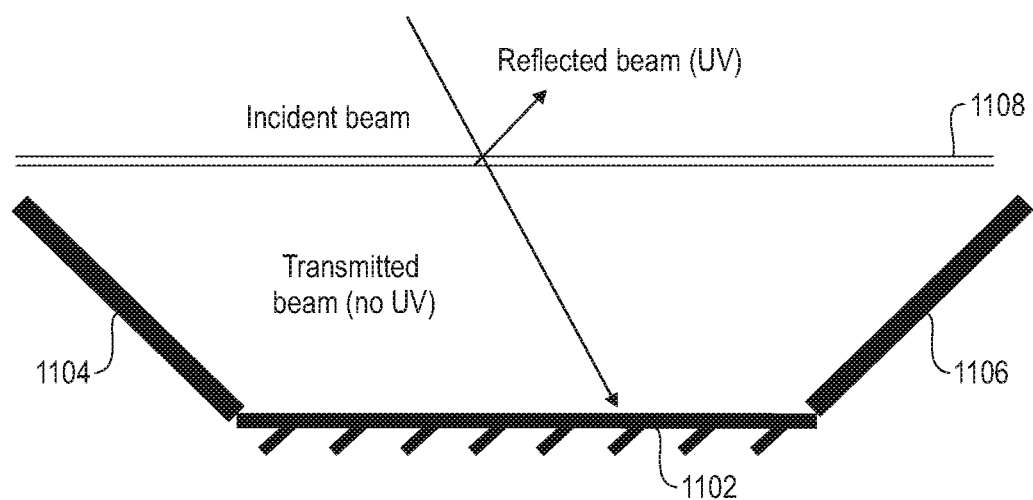
Figure 12:
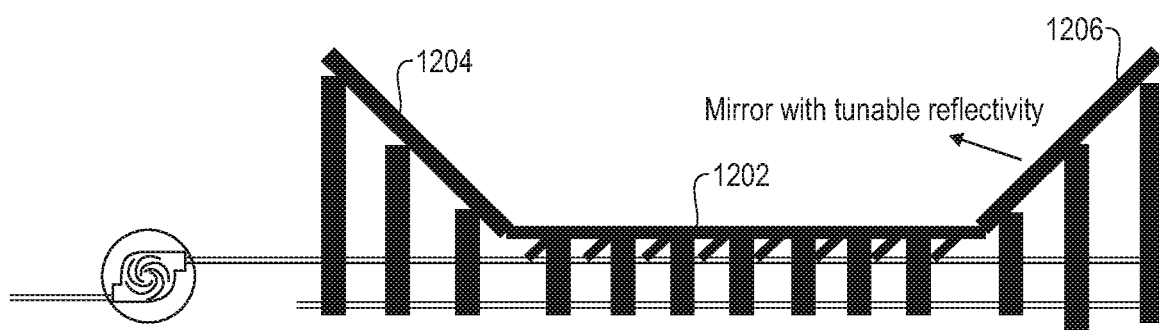
Figure 13:
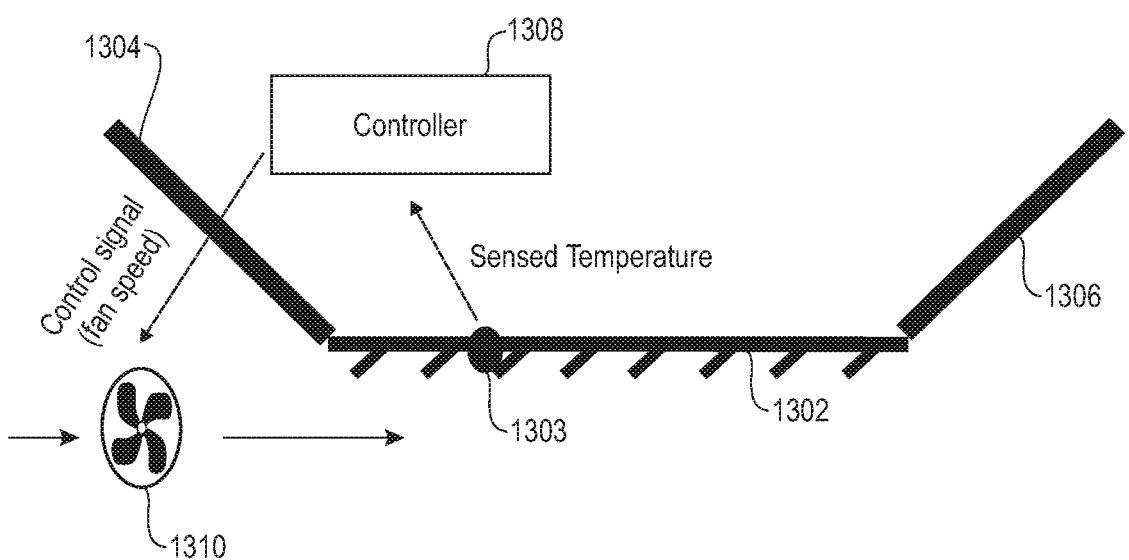
Figure 14:
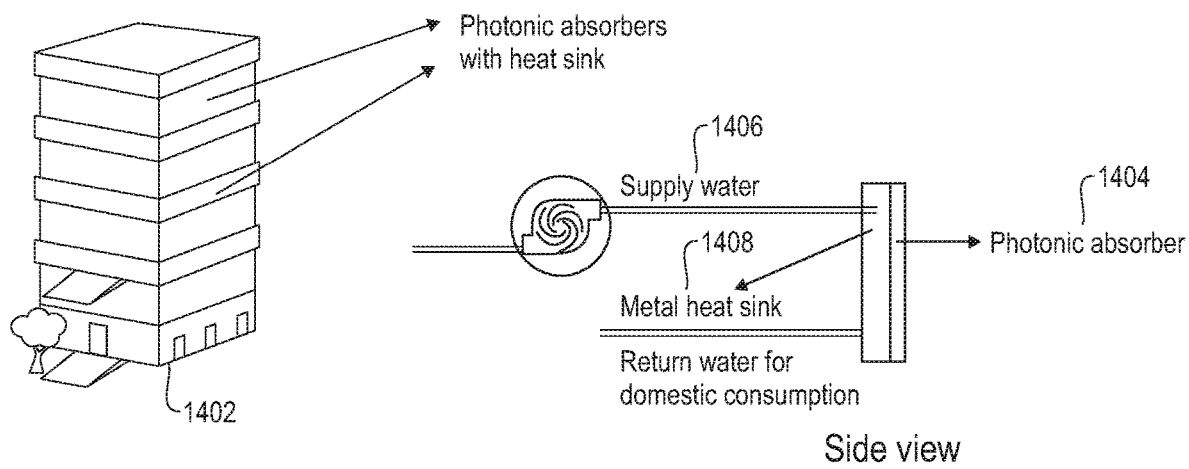
Figure 15A:
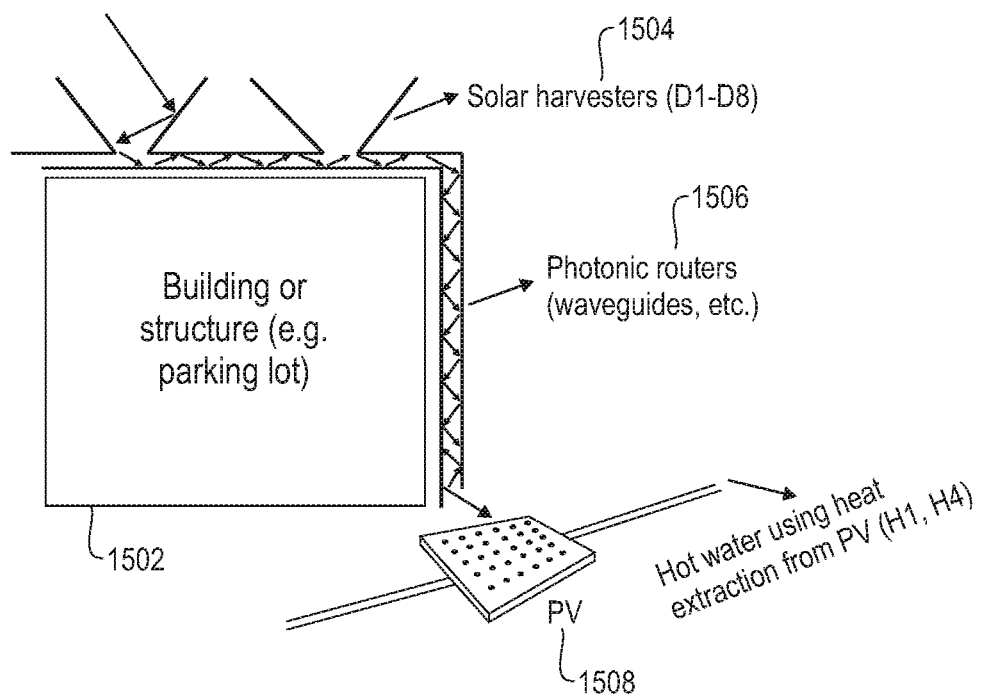
Figure 15B:
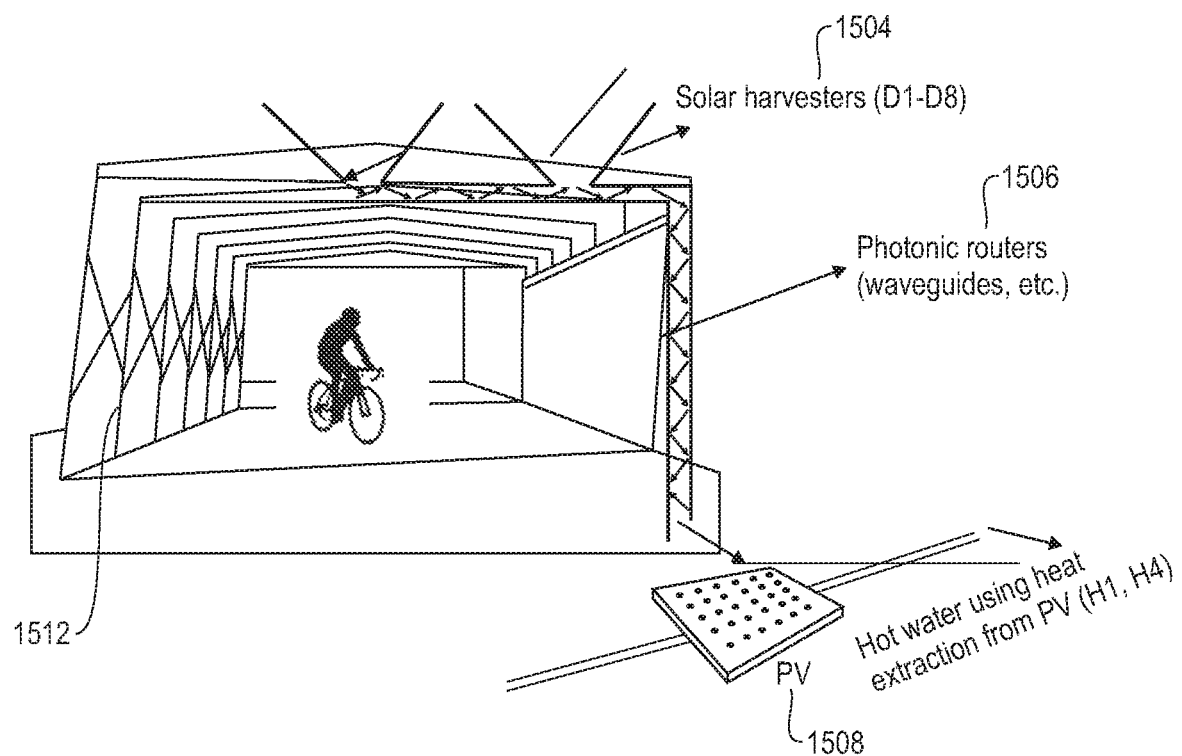
Figure 15C:
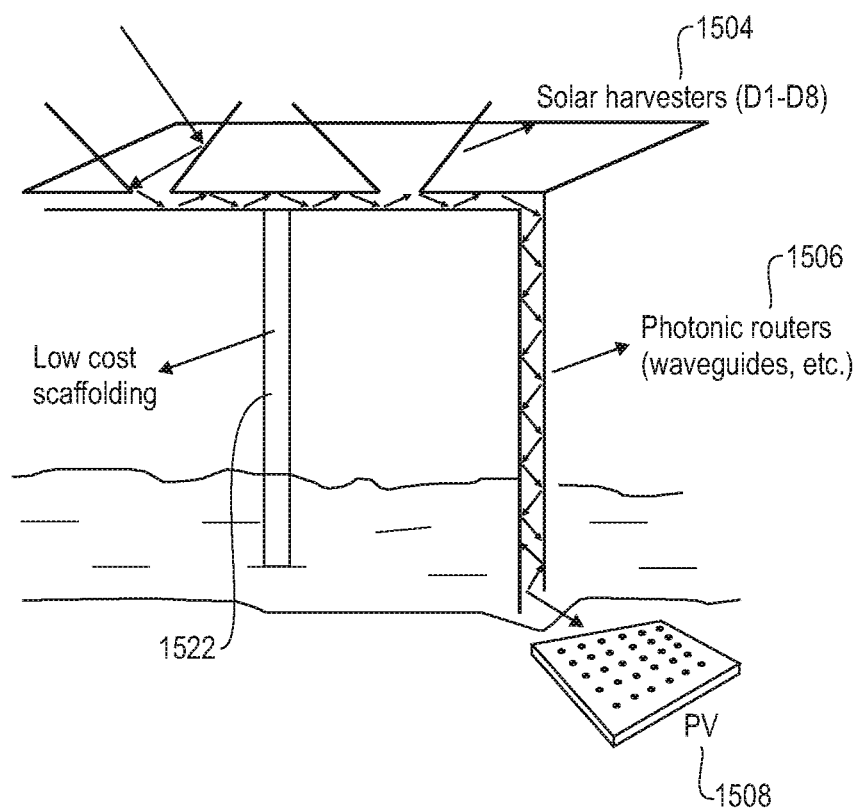
Figure 15D:
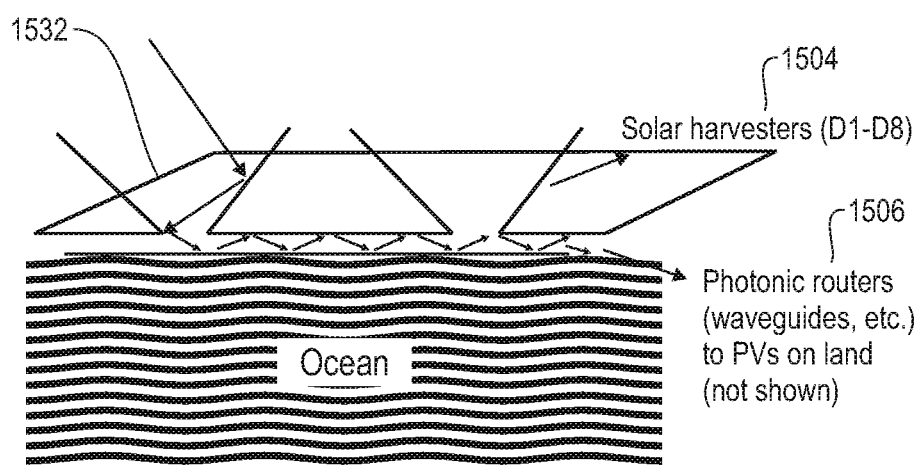
Figure 16:
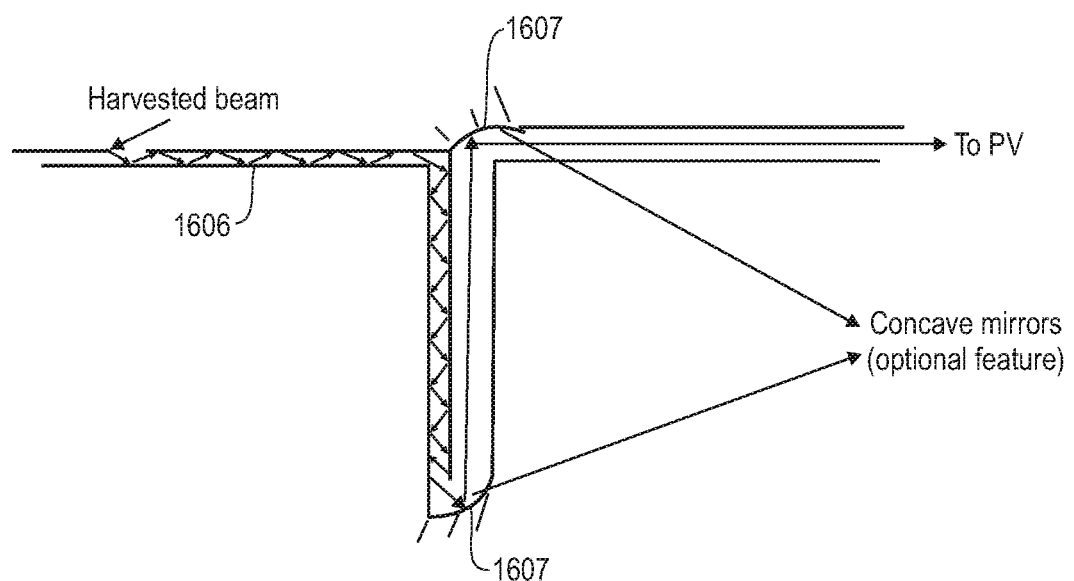
Figure 17:
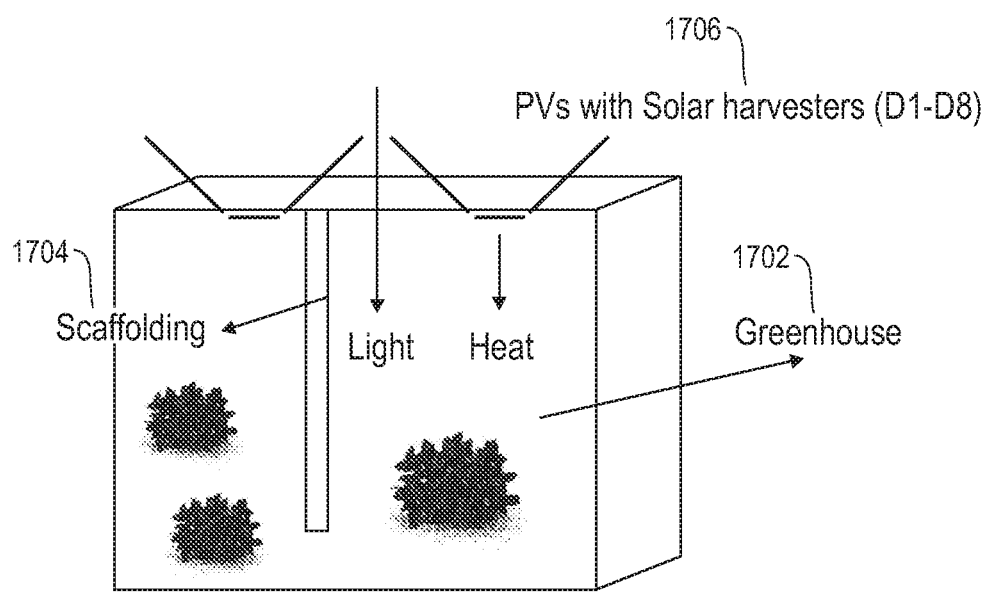
Figure 18:
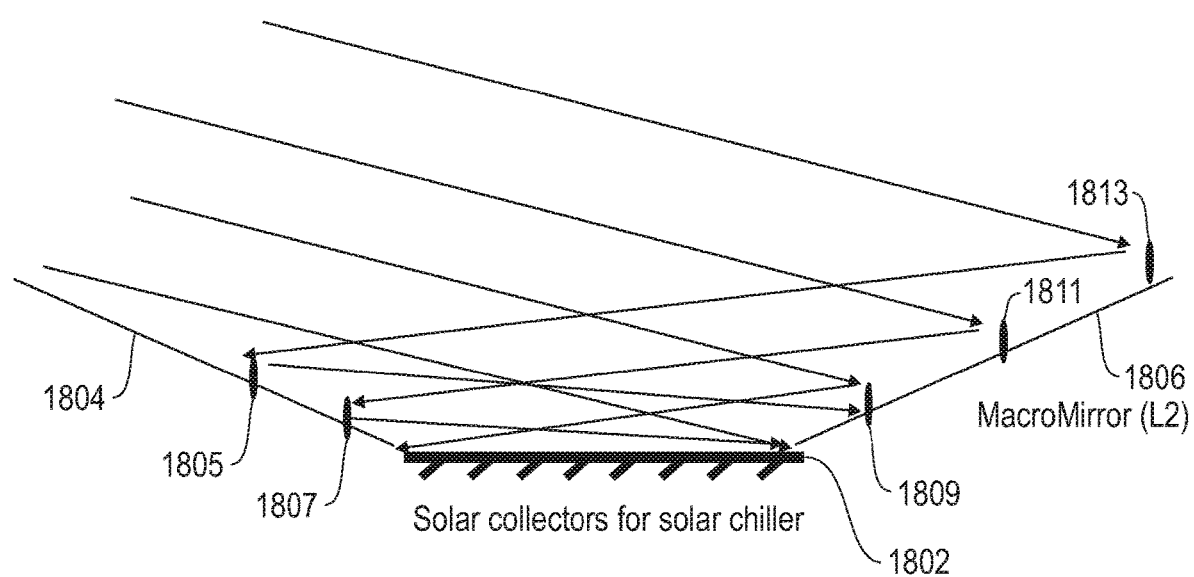
Figure 19:
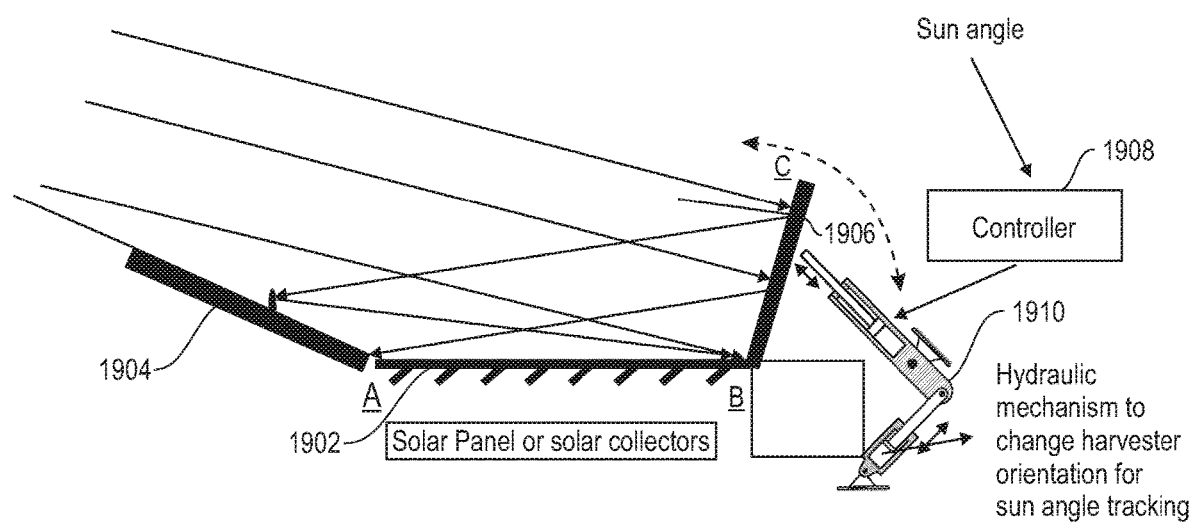
Figure 20:
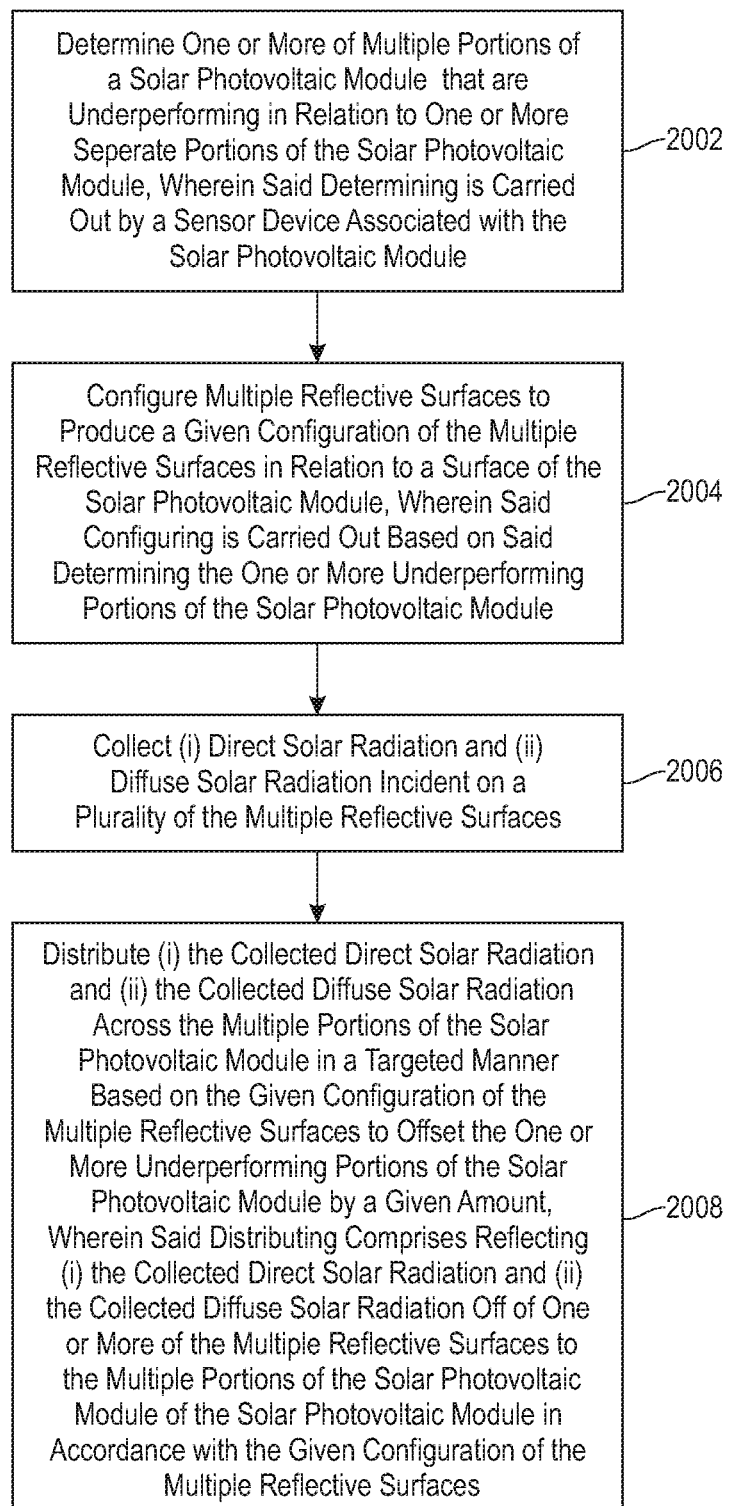
Figure 21:
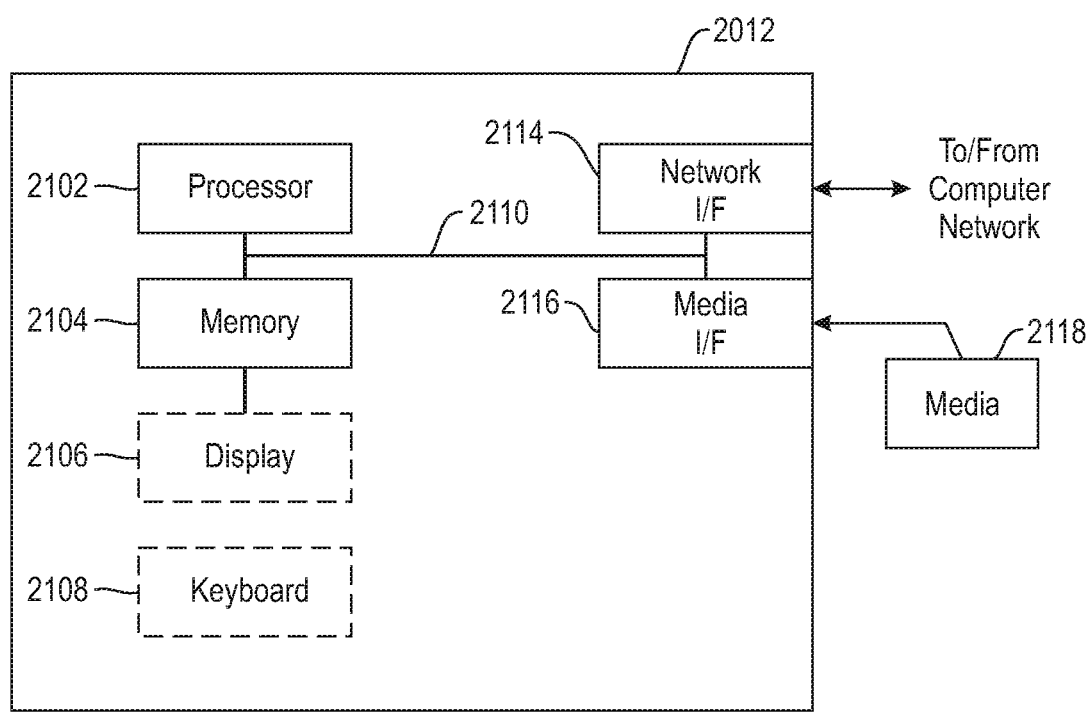

to FIG. 11 is a diagram illustrating a solar CHP design including cut-off incident heat using low-emissivity (low-e) glass, according to an example embodiment of the invention;

FIG. 12 is a diagram illustrating a solar CHP design including mirrors and/or lenses with tunable reflectivity, according to an example embodiment of the invention;

FIG. 13 is a diagram illustrating a solar CHP design including a controller, according to an example embodiment of the invention;

FIG. 14 is a diagram illustrating heat extraction from a building envelope, according to an example embodiment of the invention;

FIG. 15A is a diagram illustrating thermal insulation and photonic and thermal harvesting at a building level, according to an example embodiment of the invention;

FIG. 15B is a diagram illustrating thermal insulation and photonic and thermal harvesting at a city level, according to an example embodiment of the invention;

FIG. 15C is a diagram illustrating thermal insulation and photonic harvesting in a water-bodies environment, according to an example embodiment of the invention;

FIG. 15D is a diagram illustrating off-shore photonic harvesting, according to an example embodiment of the invention;

FIG. 16 is a diagram illustrating example photonic routers implemented via light tubes, according to an example embodiment of the invention;

FIG. 17 is a diagram illustrating photonic harvesting and heat harvesting for agricultural applications, according to an example embodiment of the invention;

FIG. 18 is a diagram illustrating photonic harvesting for solar chillers, according to an example embodiment of the invention;

FIG. 19 is a diagram illustrating tracking mirrors and/or harvesters using a hydraulic apparatus, according to an example embodiment of the invention;

FIG. 20 is a flow diagram illustrating techniques according to an embodiment of the invention; and FIG. 21 is a system diagram of an exemplary computer system on which at least one embodiment of the invention can be implemented.

DETAILED DESCRIPTION

As described herein, an aspect of the present invention includes tunable photonic harvesting for solar energy conversion and dynamic shading and soiling tolerance. At least one embodiment of the invention includes utilizing solar and/or photovoltaic (PV) modules for harvesting (or collecting) and guiding light incident on areas beyond the PV module with minimal absorption loss for a large range of angles of incident light, and spreading the harvested light onto the PV modules uniformly to maximize PV generation. Additionally, one or more embodiments of the invention include minimizing and/or combating shadowing effects and soiling by harvesting a broad spectrum of light without attenuation at low cost/levelized cost of energy (LCOE) for different times of day with optics (simple flat mirrors, heliostats, etc.) to maximize PV generation. As used herein, "light" is defined as electromagnetic and/or solar radiation of any wavelength between approximately 200 nanometers (nm) and approximately 1200 nm.

As illustrated in the figures and correspondingly described herein, one or more aspects of the invention includes apparatus and/or system designs that maintain static (semi-static or optionally mobile) mirrors that allow light to fall on the apparatus and/or system from any direction and/or angle (for example, as may happen during a cloudy day, or when clouds pass by), and wherein the resultant light, after one or more reflections, falls on the PV module and/or system.

As detailed herein, at least one embodiment of the invention can be implemented as an augmentation to an existing PV system installation or can be implemented as a separate system with auxiliary components. Such implementations can be modular to allow user- and/or operator-defined trade-offs in heat and/or electricity generation, energy yield versus lifetime impacts and capital and/or operations costs, etc. Additionally, such implementations can include remotely tunable controls for operations and maintenance. Also, example embodiments of the invention can be implemented on a PV system level, a building-integrated design level, and/or a utility-scale augmentation level.

As noted herein, at least one embodiment of the invention includes utilizing existing commodity solar PV modules and harvesting light incident on areas beyond the PV modules (also referred to herein as "cutting" light) with minimal absorption loss for a large range of angles of incident light. Additionally, at least one embodiment of the invention includes utilizing existing commodity solar PV modules and guiding the harvested light efficiently (that is, with minimal loss) over a distance via a three-dimensional (3D), twodimensional (2D) and/or one-dimensional (1D) wave guide. As used herein, a wave guide refers to a device that can transmit light waves from one location to another. Further, at least one embodiment of the invention includes utilizing existing commodity solar PV modules and distributing and/or spreading the harvested light onto the PV module(s) (also referred to herein as "pasting" light) as uniformly as possible to maximize PV generation.

An aspect of the invention also includes dynamic actions implemented in response and/or in advance of shading and soiling. For example, at least one embodiment of the invention can include automatically harvesting during morning and/or evening hours because incident insolation/irradiance is poor and the value of solar may become higher as a function of solar penetration and local energy workloads. Similarly, a designer and/or operator may wish to tune down photonic harvesting (or trade-off with a higher heat harvesting ratio) to avoid panel overheating during afternoon hours, and to keep the system near an overall max yield operating point.

As described herein, harvesting includes a combination of tracking and mild concentration, which evenly distributes harvested light across given modules. One or more embodiments of the invention, as also detailed herein, includes incorporating shadowing resistance. Light at a cell is the sum of a shadow and harvested light. Accordingly, at least one embodiment of the invention includes determining which cells in a panel are underperforming due to shadow, and implementing one or more micro-mirrors to unequally spread light to offset the shadow. Solar cell efficiency increases with concentration, and excess heat can be evacuated via a passive heat transfer system, as also further described herein.

One or more embodiments can also include incorporating specular reflectors (perfect mirrors) as well as diffuse reflectors (for example, ceramic reflectors). Additionally, reflectors that include an Ag and/or Al polished surface can have high specular reflectivity. Mirrors are often less than 90% reflective, and may absorb some parts of the spectrum. Additionally, each reflection will attenuate spectrum available for solar module. Consequently, an aspect of the invention includes reducing the number of reflections.

Mirrors, generally, can include flat mirrors, concave mirrors, and convex mirrors. Lenses can include prisms (bending light), convex lenses, and concave lenses. Concave mirrors can be similar to convex lenses (while concave mirrors can be used to minimize absorption), and concave mirrors bend light towards the principal axis. Also, a semi-concave mirror can include a concave portion on the top half of the mirror.

As detailed herein, one or more embodiments of the invention include photonic harvesting designs (also referred to herein using the notation "D*"). As further described below, FIGS. 1-8 represent multiple such photonic harvesting designs (namely, D1-D8). It is to be noted that, for simplicity, FIGS. 1-8 depict photonic harvesting designs before combined heat-harvesting. It is to be appreciated (as also detailed herein), however, that such capabilities can be modularly combined (or only a subset of functions used). Additionally, in one or more embodiments of the invention, balance of system (BOS) constraints (for example, rating of inverter, string versus micro-inverter versus power optimizer, wiring and power/current safety limits, etc.) will influence the dimensioning of the designs, and serve as an input to static planning, semi-static optimizations, and/or dynamic operational optimization.

Figure 1A:
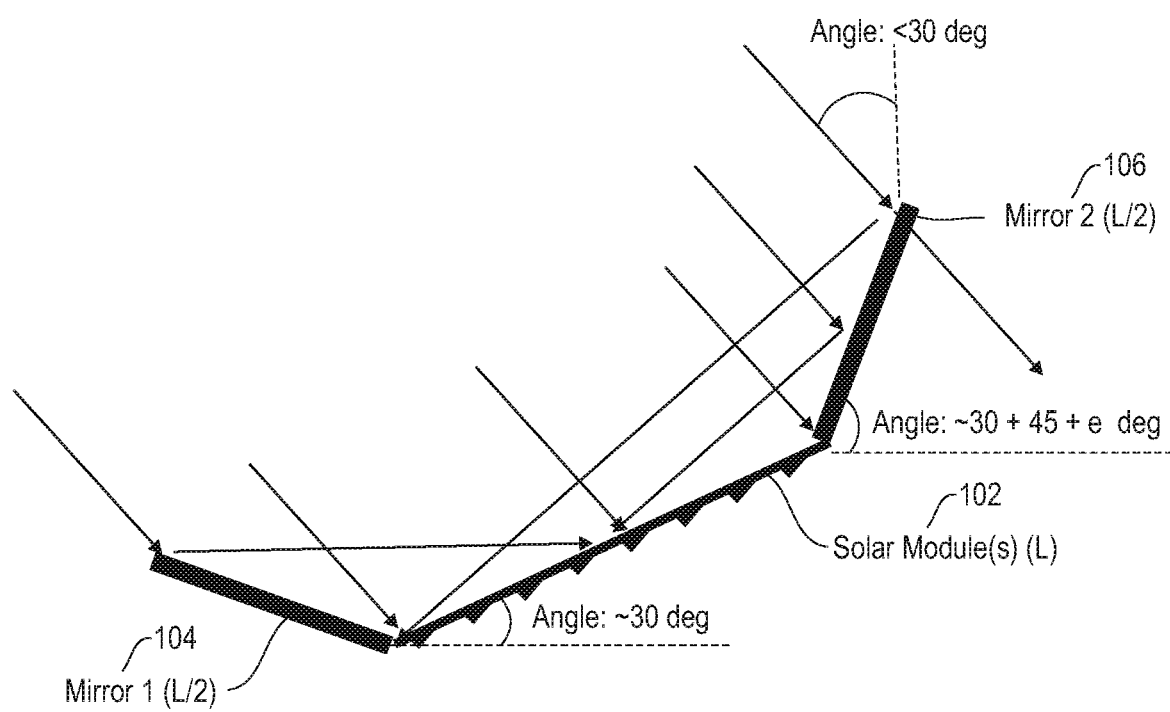
FIG. 1A is a diagram illustrating an existing harvesting design.

FIG. 1A is a diagram illustrating an existing harvesting design (D1) including rigid mirrors at fixed angles and one-axis tracking of an entire apparatus during morning hours. By way of illustration, FIG. 1A depicts a solar module/panel 102 of length L, mirror 104 of length L/2, and mirror 106 of length L/2. Mirror 104 and/or mirror 106 can be positioned, with respect to solar module 102, at a rigid angle of 45 degrees plus epsilon degrees. Longer mirrors (than those depicted in FIG. 1A, for example) will reflect away light. As noted above, epsilon illustrates the error in tracking corresponding to a scenario with imprecise tracking. Such an embodiment of the invention is robust to imprecise tracking, and hence can be cost-effective.

Also, FIG. 1A is an illustration of a system configuration (in accordance with one or more embodiments of the invention) when solar light is incident at 30 degrees to mirror 106 (representative of morning hours).

Additionally, one or more embodiments of the invention can include rotating the (mirrors and panel) arrangement depicted in FIG. 1A in one-axis to track the sun. Some parts of the panel (for example, the edges) may receive more illumination, which combats edge shading.

Figure 1B:
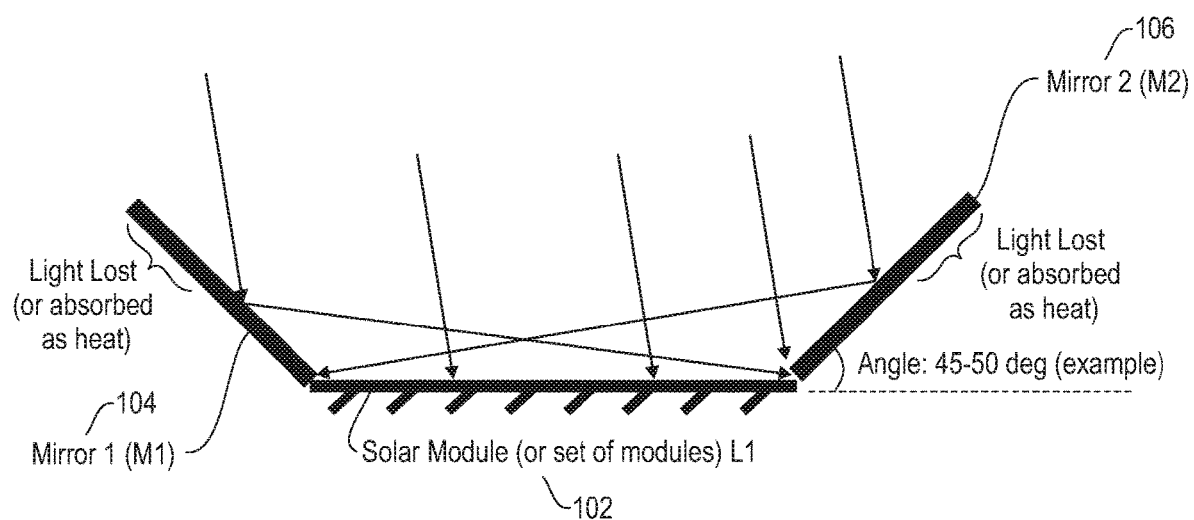
FIG. 1B is a diagram illustrating an existing harvesting design.

FIG. 1B is a diagram illustrating an existing harvesting design (D1) including rigid mirrors at fixed angles and one-axis tracking of an entire apparatus during midday hours. By way of illustration, FIG. 1B depicts the solar module/panel 102 of length L, mirror 104 of length M1, and mirror 106 of length M2. Mirror 104 and/or mirror 106 can be positioned, with respect to solar module 102, at a rigid angle of 45 degrees plus epsilon degrees. M1 and M2 can be of equal or unequal lengths, in one or more embodiments of the invention. Also, multiple modules (supported by a tracker) can be augmented. As noted in connection with FIG. 1A, the (mirrors and panel) arrangement can be rotated in one-axis to track the sun, and the control of tilt is a function of production by the panel. Additionally, at least one embodiment of the invention can include augmenting one-axis or two-axis systems rigidly (or a fixed panel system with flexible heliostat controls).

Figure 2:
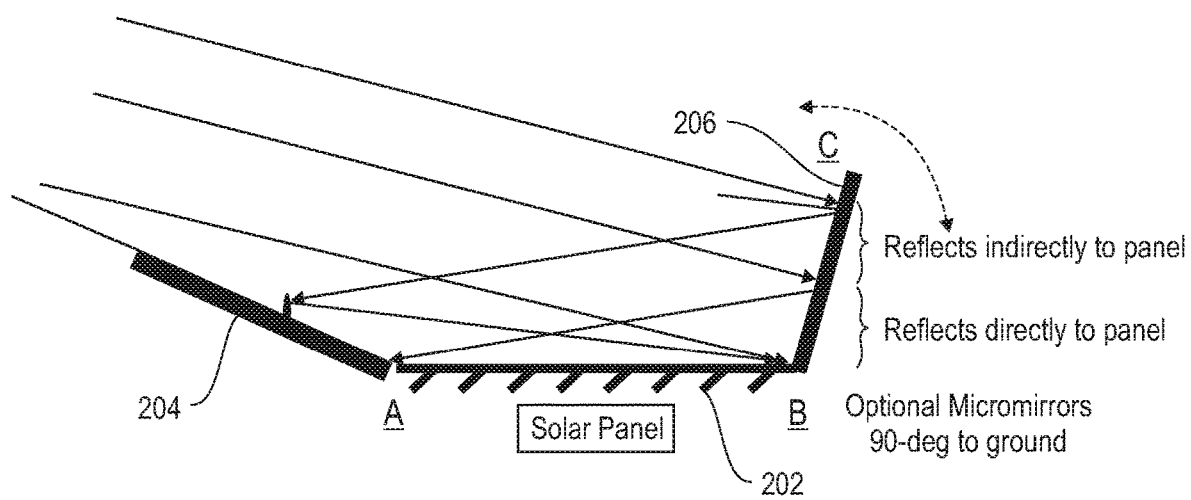
FIG. 2 is a diagram illustrating an existing harvesting design.

FIG. 2 is a diagram illustrating an existing harvesting design (D2) including tracking mirrors (based upon the time of day) and a solar module at a fixed tilt. By way of illustration, FIG. 2 depicts a solar panel (B) 202, mirror (A) 204 and mirror (C) 206. Such an embodiment includes controlling the angle of heliostatic reflector BC (that is, mirror 206 and solar panel 202) with respect to incoming rays (that is, the time of day) such that a ray hitting mirror (C) 206 will go to mirror (A) 204 (that is, evenly project the light hitting BC onto AB (that is, mirror 204 and solar panel 202)). Such an embodiment includes controlling the tilting of the macro-mirror (such as 204 and 206) and optional micro-mirrors. Additionally, the entire apparatus can be tilted as well.

Figure 3A:
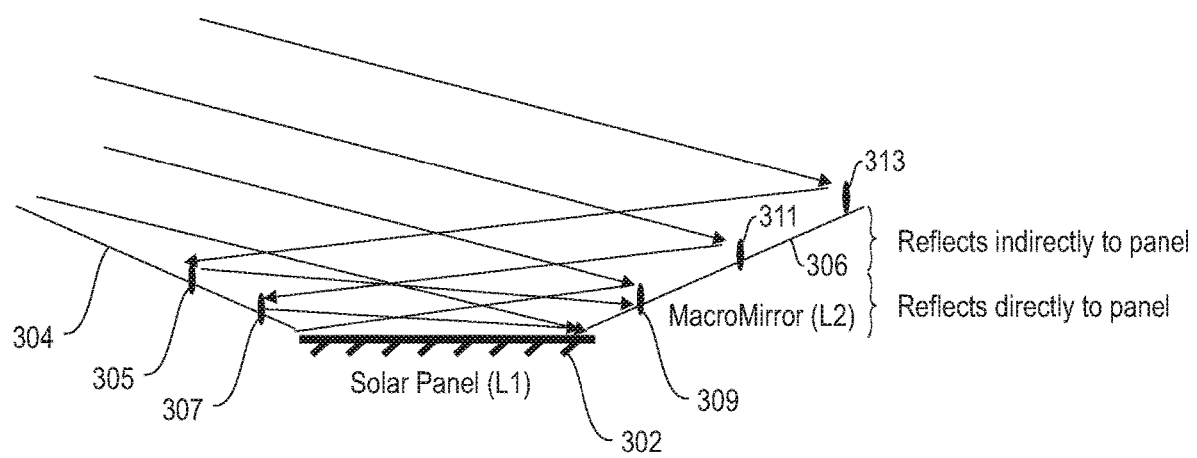
FIG. 3A is a diagram illustrating a harvesting design including fixed macro-mirrors and/or micro-mirrors, according to an example embodiment of the invention.

FIG. 3A is a diagram illustrating a harvesting design (D3) including fixed macro-mirrors and/or micro-mirrors (during morning hours), according to an example embodiment of the invention. By way of illustration, FIG. 3A depicts solar panel 302, macro-mirror 304, macro-mirror 306, and micro-mirrors 305, 307, 309, 311 and 313. Macro-mirror 304 and/or macro-mirror 306 can be ceramic (that is, a diffuse reflector) with a high frequency of fixed micro-mirrors (such as 305, 307, 309, 311 and 313). Such an arrangement can include a trade-off between losing a fraction of light and guaranteeing harvesting. Also, at least one embodiment of the invention can include implementing a microelectromechanical systems (MEMS)-based adjustment of micro-mirrors (such as 305, 307, 309, 311 and 313) to be perpendicular to macro-mirrors (such as 304 and 306).

Figure 3B:
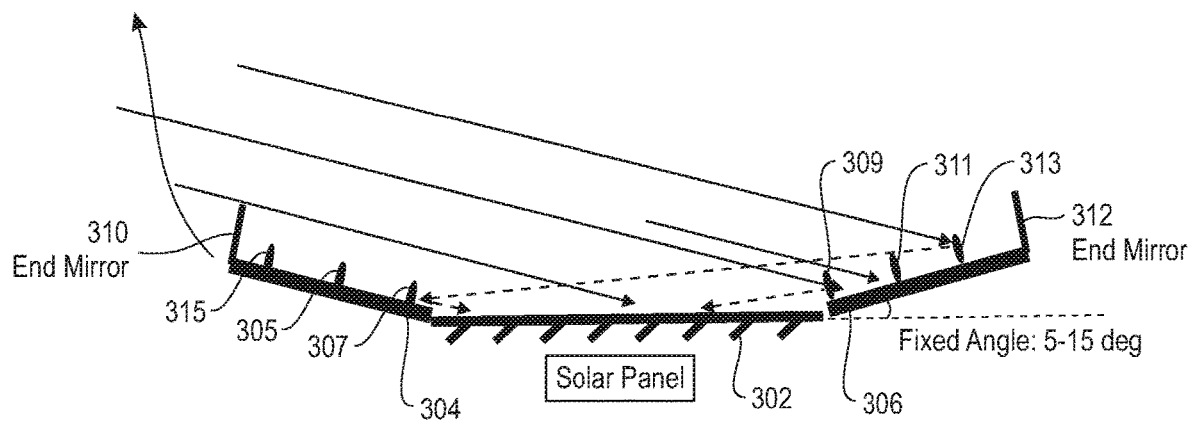
FIG. 3B is a diagram illustrating a harvesting design including fixed macro-mirrors and micro-mirrors and an end-mirror, according to an example embodiment of the invention.

FIG. 3B is a diagram illustrating a harvesting design (D3a) including fixed macro-mirrors and micro-mirrors and an end-mirror, according to an example embodiment of the invention. By way of illustration, FIG. 3B depicts an implementation with no (or very limited) orientation adjustments. Specifically, FIG. 3B depicts solar panel 302, macro-mirrors 304 and 306, micro-mirrors 305, 307, 309, 311, 313 and 315, and end mirrors 310 and 312.

In such an embodiment as depicted in FIG. 3B, during typical mid-day/afternoon hours, some light will be reflected. Accordingly, at least one embodiment of the invention includes tuning the absorption of heat at mid-day or implementing an internal light guide to couple the light back to the solar panel during mid-day hours. Referring back to FIG. 3B, macro-mirrors 304 and 306 can be positioned (with respect to solar panel 302) at an angle of 5-15 degrees to allow harvesting of a maximal area. Micro-mirror strips (such as 315, 305 and 307, or 309, 311 and 313) can be positioned at 90 degrees to a given macro-mirror (for example, to ensure vertical light (waterfall indentations). The design depicted in FIG. 3B ensures low shadows by micro-mirror strips.

It should be noted that, as depicted in FIGS. 4-8, D4-D8 can allow lower angled macro-mirrors than D3, and that D4 and lens structures can have higher absorption losses. Note also that photonic waveguides are variants of D4.

Figure 4:
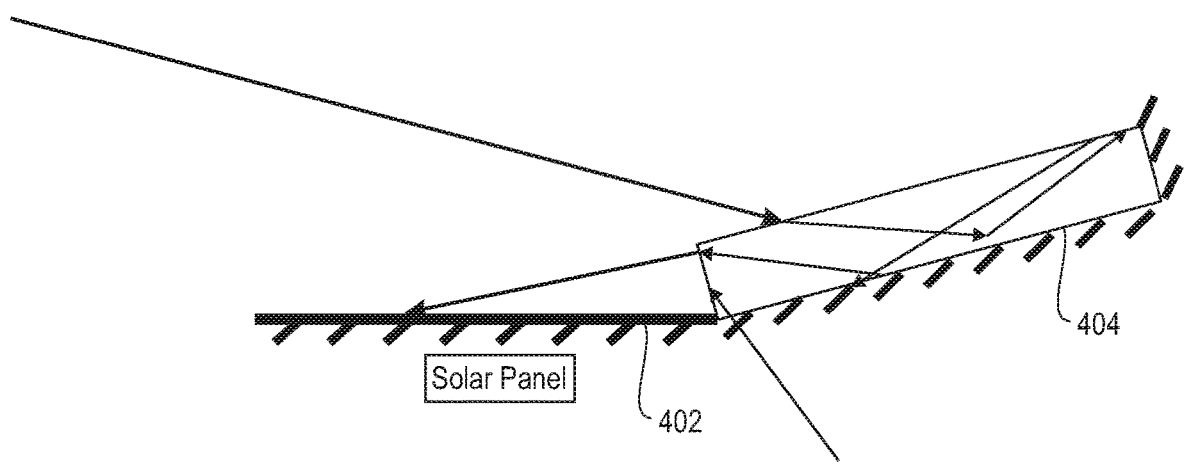
FIG. 4 is a diagram illustrating a harvesting design including a waveguide mirror, according to an example embodiment of the invention.

Accordingly, FIG. 4 is a diagram illustrating a harvesting design (D4) including a waveguide mirror, according to an example embodiment of the invention. By way of illustration, FIG. 4 depicts a solar panel 402 and a waveguide mirror 404 that includes an anti-reflection coating (ARC) at a top surface thereof, and a rough surface for trapping light. The waveguide mirror 404 guides trapped light out uniformly over the surface of the panel 402. Such a design minimizes absorption of spectrum within the planar waveguide 404, and exit of all light entering the medium is internally reflected back to the panel 402. Additionally in one or more embodiments of the invention, waveguide exit structure options include a flat structure, a concave structure, a prismatic diffuser (such as light-emitting diode (LED) lights), etc.

Figure 5:
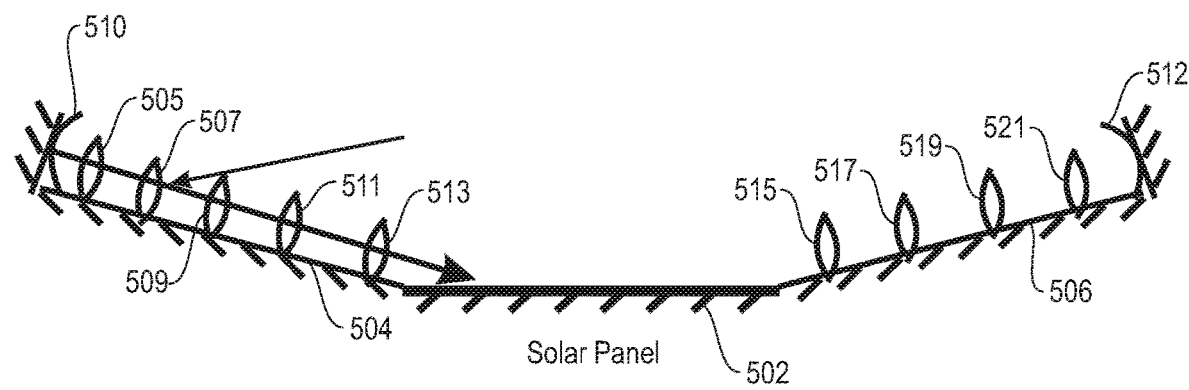
FIG. 5 is a diagram illustrating a harvesting design including a macro-mirror, micro-lens, and a concave end mirror, according to an example embodiment of the invention.

FIG. 5 is a diagram illustrating a harvesting design (D5) including a solar panel 502, fixed macro-mirrors 504 and 506, micro-lenses (505, 507, 509, 511, 513, 515, 517, 519 and 521), and concave end mirrors 510 and 512, according to an example embodiment of the invention. The micro-lenses (505, 507, 509, 511, 513, 515, 517, 519 and 521) deflect the light back to the solar panel 502, resulting in solar harvesting. The end-mirrors (510 and 512) further assist in solar harvesting by reflecting light towards the solar panel 502. The lenses and end mirrors enable harvesting of light for a wide range of sun angles and hence do not require solar tracking using heliostats, etc.

Figure 6:
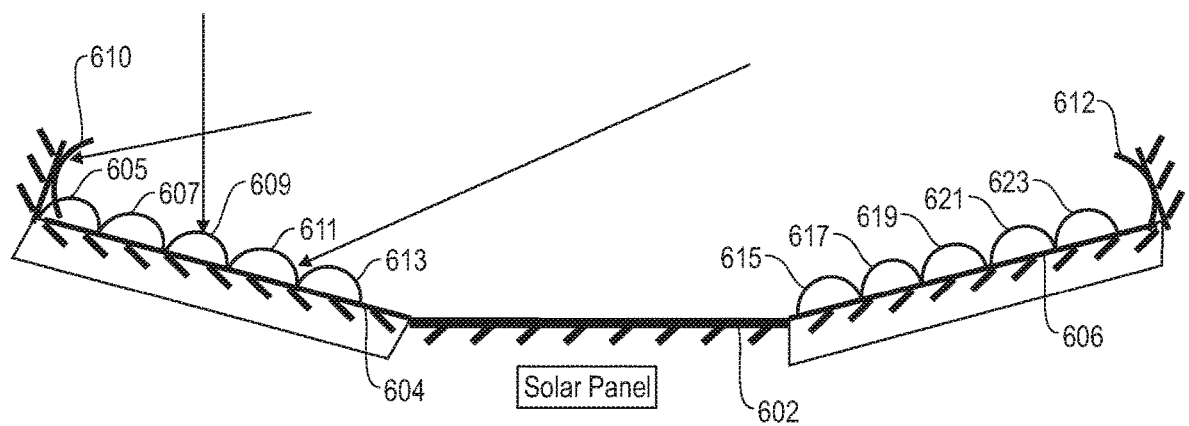
FIG. 6 is a diagram illustrating a harvesting design including a macro-mirror, micro-hemispheres, and a concave end mirror, according to an example embodiment of the invention.

FIG. 6 is a diagram illustrating a harvesting design (D6) including a solar panel 602, fixed macro-mirrors 604 and 606, micro-hemispheres (605, 607, 609, 611, 613, 615, 617, 619, 621 and 623), and concave end mirrors 610 and 612, according to an example embodiment of the invention. Also, such an embodiment of the invention can alternatively include semi-concave end mirrors. The micro-hemispheres (605, 607, 609, 611, 613, 615, 617, 619, 621 and 623) reflect the light back to the solar panel 602, resulting in solar harvesting. The end-mirrors (610 and 612) further assist in solar harvesting by reflecting light towards the solar panel 602. The hemispheres and end mirrors enable harvesting of light for a wide range of sun angles and hence do not require solar tracking using heliostats, etc.

Figure 7A:
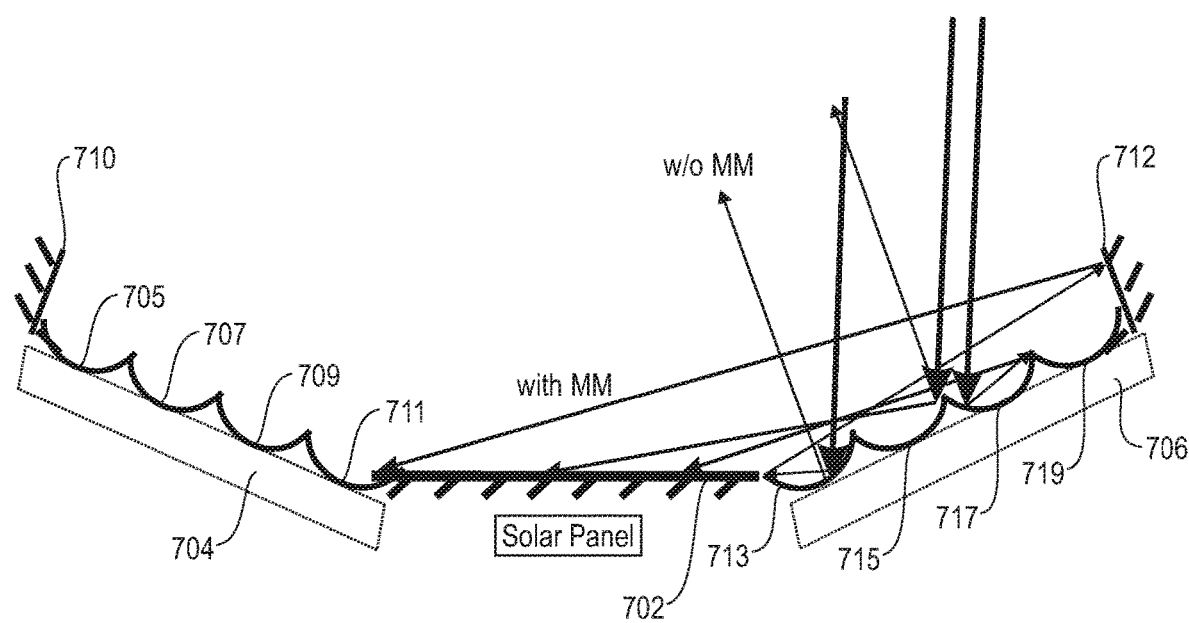
FIG. 7A is a diagram illustrating a harvesting design including a fixed macro-mirror, concave micro-mirrors, and an end mirror, according to an example embodiment of the invention.

FIG. 7A is a diagram illustrating a harvesting design (D7) including a solar panel 702, fixed macro-mirrors 704 and 706, concave micro-mirrors (705, 707, 709, 711, 713, 715, 717 and 719), and end mirrors 710 and 712, according to an example embodiment of the invention. The micro-mirrors (705, 707, 709, 711, 713, 715, 717 and 719) reflect the light back to the solar panel 702, resulting in solar harvesting. The end-mirrors (710 and 712) further assist in solar harvesting by reflecting light towards the solar panel 702. The lenses and end mirrors enable harvesting of light for a wide range of sun angles and hence do not require solar tracking using heliostats, etc.

Figure 7B:
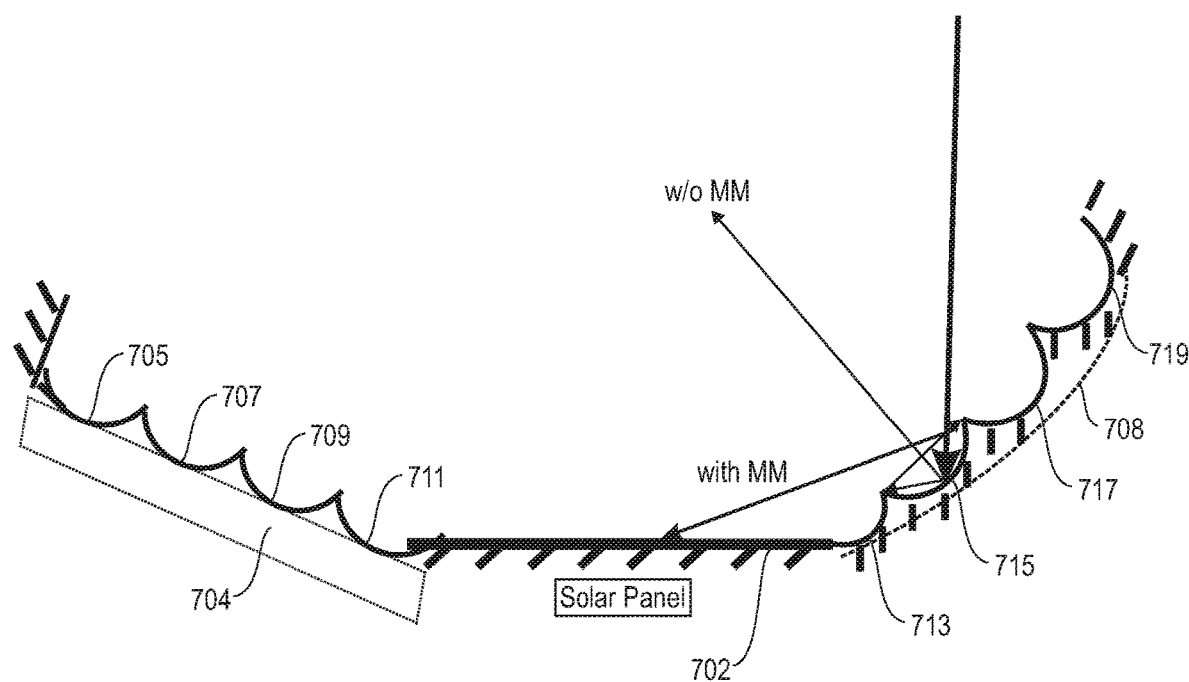
FIG. 7B is a diagram illustrating a harvesting design including a fixed concave macro-mirror and concave micro-mirrors, according to an example embodiment of the invention.

FIG. 7B is a diagram illustrating a harvesting design (D7a) including a solar panel 702, a fixed concave macro-mirror 708 and concave micro-mirrors (705, 707, 709, 711, 713, 715, 717 and 719), according to an example embodiment of the invention. The micro-mirrors (705, 707, 709, 711, 713, 715, 717 and 719) reflect the light back to the solar panel 702, resulting in solar harvesting. A difference between, for example, the design illustrated in FIG. 7A and the design illustrated in FIG. 7B is that the macro-mirror is concave in the design illustrated in FIG. 7B. Similar to the design illustrated in FIG. 7A, the design illustrated in FIG. 7B performs harvesting for a wide range of sun angles and hence does not require solar tracking using heliostats, etc.

Figure 7C:
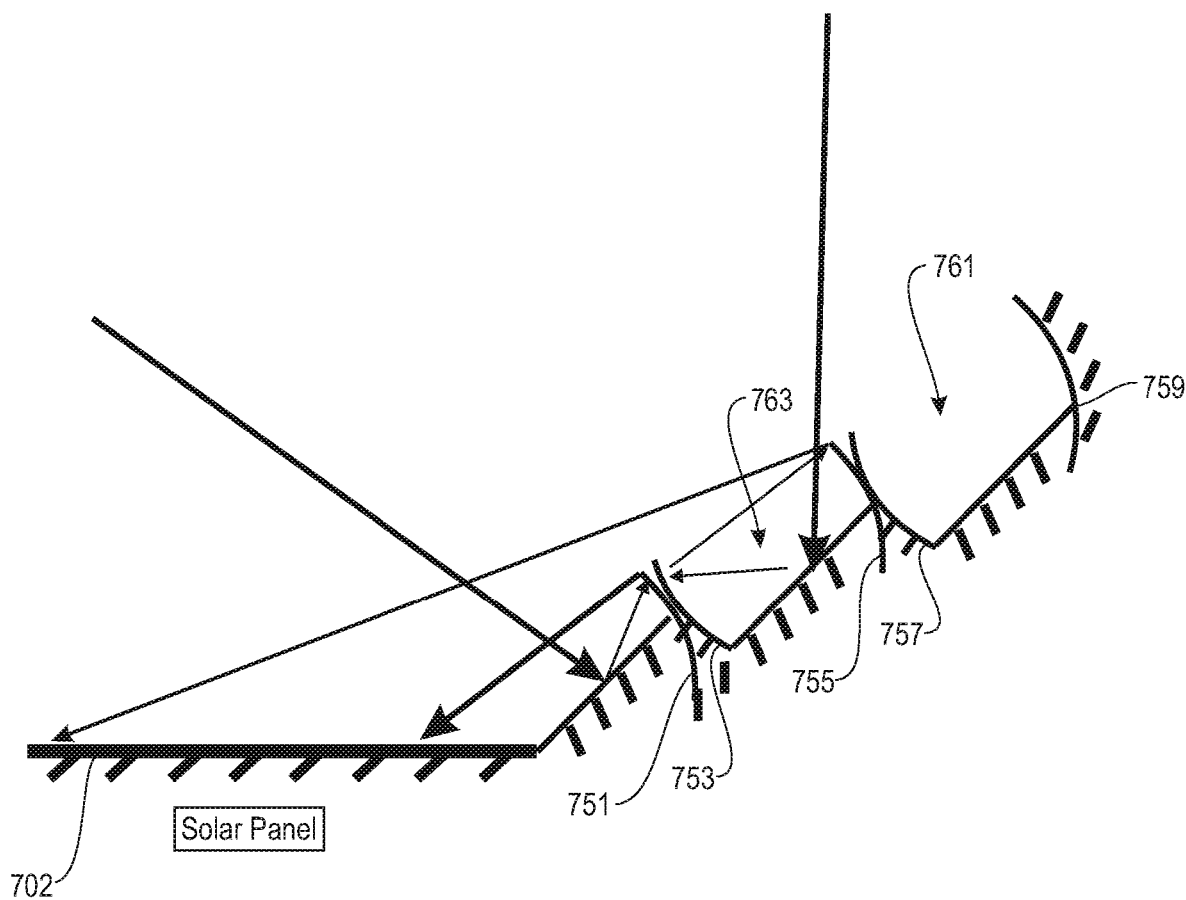
FIG. 7C is a diagram illustrating a harvesting design including a fixed concave macro-mirror, concave micro-mirrors, and cavities, according to an example embodiment of the invention.

FIG. 7C is a diagram illustrating a harvesting design (D7b) including a solar panel 702, fixed concave macro-mirrors, concave micro-mirrors (751, 753, 755, 757 and 759), and cavities 761 and 763, according to an example embodiment of the invention. The micro-mirrors (751, 753, 755, 757 and 759) reflect the light back to the solar panel 702, resulting in solar harvesting. Similar, for example, to the designs illustrated in FIG. 7A and FIG. 7B, the design depicted in FIG. 7C performs harvesting for a wide range of sun angles and hence does not require solar tracking using heliostats, etc.

Additionally, in the design illustrated in FIG. 7C, the cavities (761 and 763) are not physical components but represent gaps between two directly facing micro-mirrors. Please also note that the macro-mirrors are not shown in FIG. 7C, but can be any of the macro-mirrors from the designs depicted in the other figures herein (such as FIGS. 1-7B as well as FIG. 8), such as a planar mirror or a concave mirror. Also, in an example embodiment of the invention, such as depicted in FIG. 7C, the macro-mirror can be referred to as an "envelope."

Figure 8:
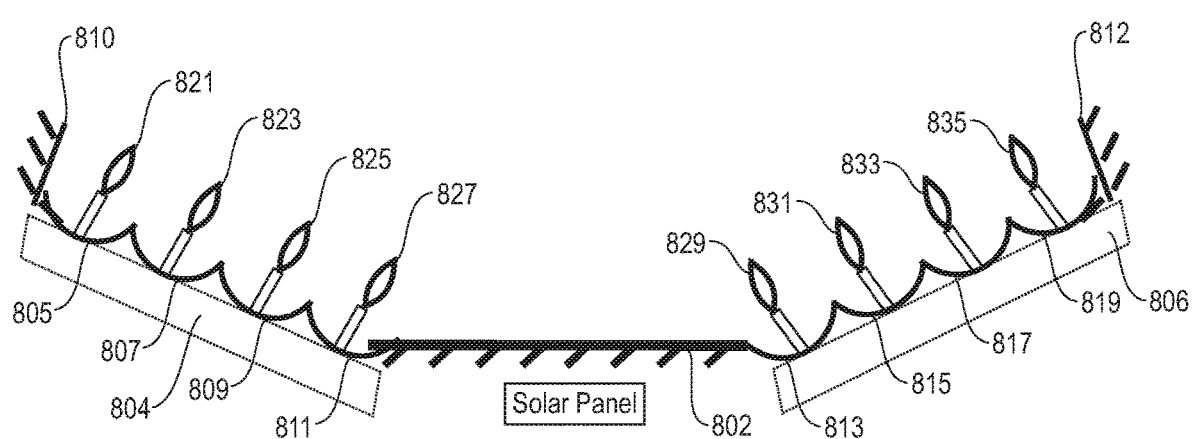
FIG. 8 is a diagram illustrating a harvesting design including a fixed macro-mirror, concave micro-mirrors, mounted micro-lenses, and an end mirror, according to an example embodiment of the invention.

FIG. 8 is a diagram illustrating a harvesting design (D8) including a solar panel 802, fixed macro-mirrors 804 and 806, concave micro-mirrors (805, 807, 809, 811, 813, 815, 817 and 819), mounted micro-lenses (821, 823, 825, 827, 829, 831, 833 and 835), and end mirrors 810 and 812, according to an example embodiment of the invention. The harvesting design depicted in FIG. 8 is also referred to herein as the candle design. As depicted, the mounting for the micro-lenses can include a rectangular transparent glass (low absorption), which parallely offsets incoming light. The micro-mirrors (805, 807, 809, 811, 813, 815, 817 and 819) and micro-lenses (821, 823, 825, 827, 829, 831, 833 and 835) reflect the light back to the solar panel 802, resulting in solar harvesting. The end-mirrors (810 and 812) further assist in solar harvesting by reflecting light towards the solar panel 802. Similar to the designs illustrated in FIGS. 1-7, the arrangement depicted in FIG. 8 performs harvesting for a wide range of sun angles and hence does not require solar tracking using heliostats, etc.

In connection with embodiments of the invention implemented in accordance with the harvesting designs depicted in FIGS. 1-8, such embodiments include optical augmentation for shading and soiling resistance and balanced gains via, for example, utilization of a prismatic diffuser (low absorption) that can be used in conjunction with photonic harvest for shadow diffusion. Such a diffuser can diffuse both incident light and incident shadow (dynamic or static (for example, soiling)), and can also incorporate superposition of light and/or shadow sources, which leads to averaging incident photonic flux over the panel and/or harvesting apparatus surface area. Low e-glass can also reduce incident heat on a solar module.

Additionally, photonic harvesting further diffuses shadowing, and the height above the solar module also extends light path lengths (versus a diffuser right on top of modules). Both morning/evening and peak solar flux can be diffused, which results in more uniform spreading of harvested photonic flux. Further, tunable photonic absorption can be remote activated to reduce peak solar flux if a system operating is at risk.

As noted herein, one or more embodiments of the invention include modular scaling of photonic augmentation designs. Such embodiments can include implementing augmentation(s) at the boundaries of current (sub)systems. Also, shading tolerance, as detailed herein in connection with one or more embodiments of the invention, results in additional area and/or capacity in addition to re-powering at the module level. By way of example, with respect to the modularity, one or more embodiments of the invention can include carrying out only photonic harvesting (using D3-D8, for instance), or can include carrying out only heat harvesting (using H1 and H4, for instance), or can include carrying out both photonic and heat harvesting by combining any of D3-D8 and H1 and H4, for example.

As detailed herein, at least one embodiment of the invention includes implementing a combined and tunable photonic and heat harvesting design. In such embodiments, solar combined heat and power (CHP) can result in benefits such as increased electrical throughput with photonic harvesting, increased system life (lower PV temperatures will reduce thermal wear and enhance asset lifecycle), and faster payback (dual use of solar for electricity and heating further offsets energy use, shading side effect of harvesting system on buildings can further reduce the amount of cooling required, etc.). Solar CHP designs, as detailed herein, can include convection from a top surface, as well as convection from a bottom surface. Also, in one or more embodiments of the invention, a non-CHP design can include cutting-off incident heat using heat reflecting low e-glass.

As detailed herein, one or more embodiments of the invention include solar CHP designs (also referred to herein using the notation "H*"). As further described below, FIGS. 9-12 represent multiple such solar CHP designs (namely, H1-H5). It is to be appreciated, as detailed herein, that any of the H* designs can be combined with any of the D* designs (described herein) to create multiple embodiments. Note also that H3 and H4, depicted in FIG. 11 and FIG. 12, respectively, include features that can be combined with the H1 and/or H2 designs (depicted in FIG. 9 and FIG. 10, respectively).

Figure 9:
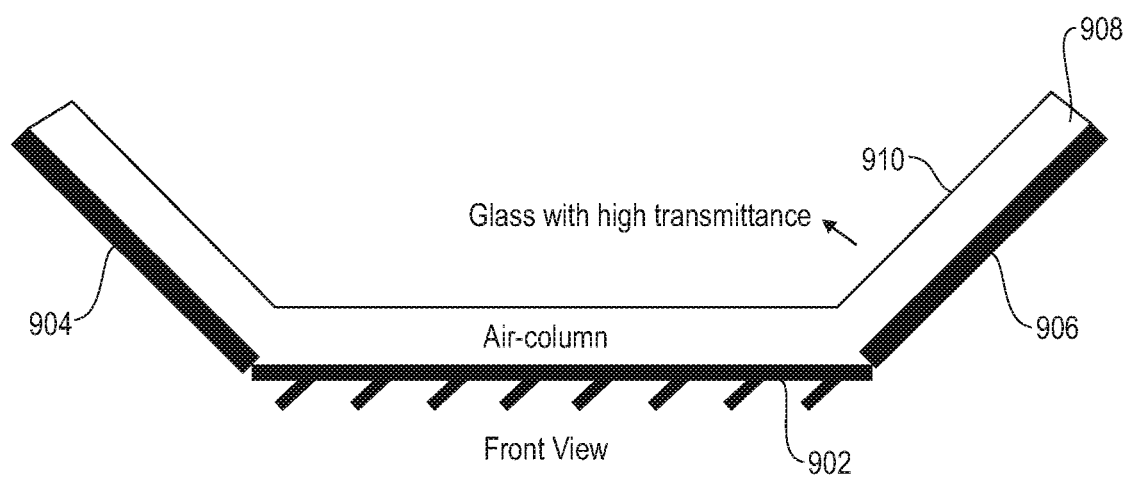
FIG. 9 is a diagram illustrating a solar combined heat power (CHP) design including convection from a top portion, according to an example embodiment of the invention.

FIG. 9 is a diagram illustrating a solar CHP design (H1) including convection from a top portion, according to an example embodiment of the invention. By way of illustration, FIG. 9 depicts a solar panel 902, mirrors 904 and 906, air column 908 and glass 910 with high transmittance. Cold or ambient air enters from one side of the air column 908 and hot air exits out the other side of the air column 908. In one or more embodiments of the invention, an air-to-water heat exchanger (not shown in FIG. 9) can be used to transfer heat to water, which can be used for domestic hot water consumption. At least one embodiment of the invention includes utilizing air as a medium because of air's lower refractive index as compared to water. As noted above, the solar CHP design depicted in FIG. 9 can be combined with any of the solar harvesting systems detailed herein (D1-D8), and it should be noted that D1 is depicted in FIG. 9 simply for purposes of illustration.

Figure 10A:
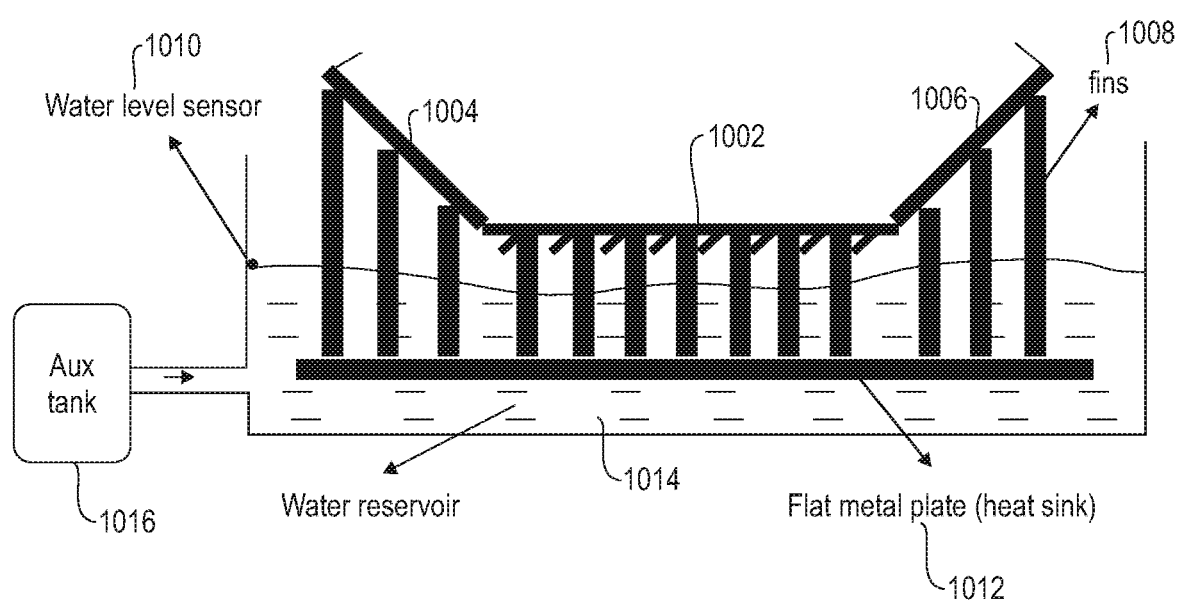
FIG. 10A is a diagram illustrating a solar CHP design including an open-loop system with convection from a bottom portion, according to an example embodiment of the invention.

FIG. 10A is a diagram illustrating a solar CHP design (H2a) including an open-loop system with convection from a bottom portion, according to an example embodiment of the invention. By way of illustration, FIG. 10A depicts a solar panel 1002, mirrors 1004 and 1006, a collection of fins 1008 positioned on top of a flat metal plate (heat sink) 1012, and a water level sensor 1010. The solar CHP design depicted in FIG. 10A illustrates natural heat convection from fins 1008 to air, and natural heat convection from heat sink 1012 to water 1014 (as provided by auxiliary tank 1016, for example). An example embodiment of the invention implementing the solar CHP design depicted in FIG. 10A can additionally include a replenishment mechanism with a level control system (not shown) to maintain a constant water level (to compensate for evaporation). Also, hot water in the reservoir 1014 can be ducted, for example, for domestic hot water needs via a secondary system (not shown). As noted above, the solar CHP design depicted in FIG. 10A can be combined with any of the solar harvesting systems detailed herein (D1-D8), and it should be noted that D1 is depicted in FIG. 10A simply for purposes of illustration.

Figure 10B:
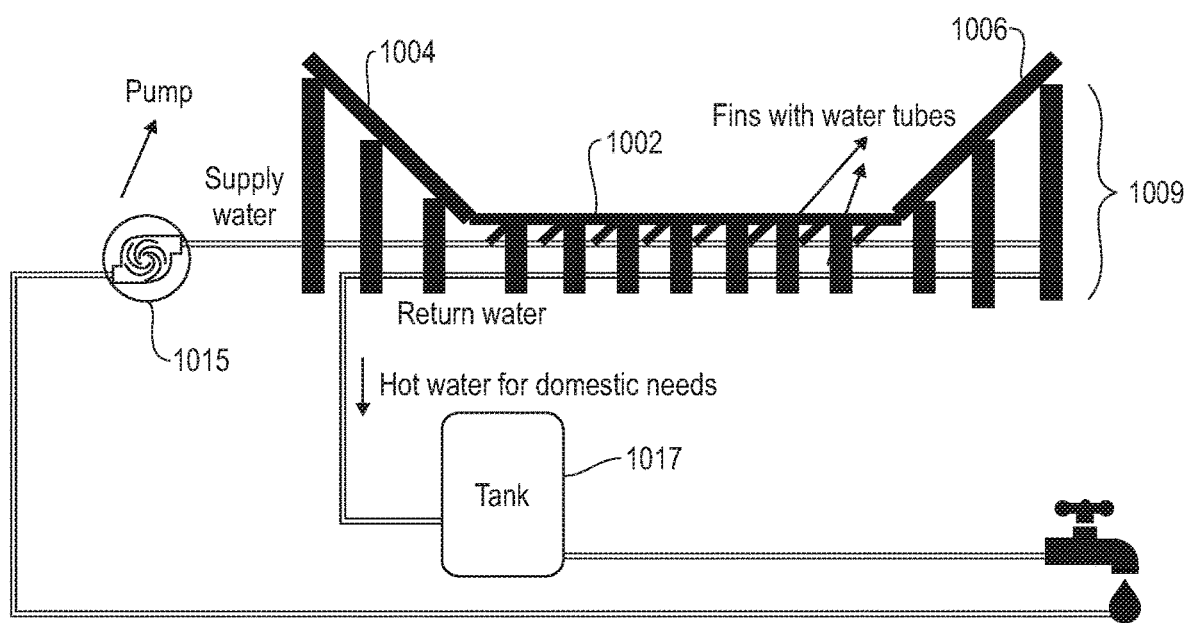
FIG. 10B is a diagram illustrating a solar CHP design including a closed-loop system with convection from a bottom portion, according to an example embodiment of the invention.

FIG. 10B is a diagram illustrating a solar CHP design (H2b) including a closed-loop system with convection from a bottom portion, according to an example embodiment of the invention. By way of illustration, FIG. 10B depicts a solar panel 1002, mirrors 1004 and 1006, and a collection of fins 1009 that include water tubes. The solar CHP design depicted in FIG. 10B illustrates forced heat convection from fins 1009 to water. Such an embodiment of the invention can additionally include micro-channels and macro-channels. How water in a reservoir (as supplied by pump 1015, for example) can be ducted for domestic hot water needs via a secondary system (such as tank 1017). Such a solar CHP design can be useful, for example, for geographies with water shortages because the design avoids the need to replenish water. As noted above, the solar CHP design depicted in FIG. 10B can be combined with any of the solar harvesting systems detailed herein (D1-D8), and it should be noted that D1 is depicted in FIG. 10B simply for purposes of illustration.

FIG. 11 is a diagram illustrating a solar CHP design (H3) including cut-off incident heat using low-e glass, according to an example embodiment of the invention. By way of illustration, FIG. 11 depicts a solar panel 1102, mirrors 1104 and 1106, and low-e glass 1108. Low e-glasses (such as 1108) are currently in use for building façade designs, and can also be used for PVs to reduce heat input to a PV panel and solar harvesters. As noted above, the solar CHP design depicted in FIG. 11 can be combined with any of the solar harvesting systems detailed herein (D1-D8), and it should be noted that D1 is depicted in FIG. 11 simply for purposes of illustration. Additionally, the solar CHP design depicted in FIG. 11 does not provide heat extraction but does enable temperature reduction of the solar panel 1102. Also, the solar CHP design depicted in FIG. 11 can be combined with a shadow-tolerant prismatic diffusive apparatus (such as detailed herein).

FIG. 12 is a diagram illustrating a solar CHP design (H4) including mirrors and/or lenses with tunable reflectivity, according to an example embodiment of the invention. By way of illustration, FIG. 12 depicts a solar panel 1202, and mirrors 1204 and 1206 with tunable reflectivity using, for example, thin-film liquid crystal technology. Heat harvesting can be performed via forced convection with a system using circulating water (circulated using a pump). The solar CHP design depicted in FIG. 12 allows for a trade-off between components of incident energy used for solar harvesting and heating: $I_{ref} = rI_0$, $I_{trm+abs} = I_{heat} = (1-r)I_0$. As used above, $I_0$=incident flux; r=reflectivity of the lenses (tunable), $I_{ref}$=reflected flux; $I_{trm+abs}$=the sum of reflected and absorbed flux; and $I_{heat}$=heat flux. Also, the solar CHP design depicted in FIG. 12 allows for the ability to adjust an electricity versus heating trade-off, depending on demand.

Accordingly, an example embodiment of the invention such as depicted in FIG. 12 can include a system for photonic harvesting with the capability to tune the electrical and thermal throughput from the solar CHP system, depending on one or more user requirements.

As noted above, the solar CHP design depicted in FIG. 12 can be combined with any of the solar harvesting systems detailed herein (D1-D8) as well as any of the CHP systems detailed herein (H1-H3), and it should be noted that D1 and H2(b) are depicted in FIG. 12 simply for purposes of illustration.

FIG. 13 is a diagram illustrating a solar CHP design (H5) including a controller 1308, according to an example embodiment of the invention. By way of illustration, FIG. 13 depicts a solar panel 1302, and mirrors 1304 and 1306 with tunable reflectivity. FIG. 13 also depicts a controller 1308 and a fan 1310. Specifically, the solar CHP design (H5) depicted in FIG. 13 illustrates an example embodiment of the invention that includes using modulated forced convection for heat dissipation. Such an embodiment includes utilizing forced convection (using fans such as illustrated via component 1310) to dissipate heat from PV panels (such as 1302). Additionally, such an embodiment of the invention can include one or more sub-embodiments wherein, for example, heat is dissipated from the top and/or bottom.

As illustrated in FIG. 13, the controller 1308 (for example, a proportional-integral (PI) controller) regulates the fan speed of fan 1310 (using variable frequency drives) to cool the panel 1302 to a certain set-point temperature. Moreover, as also depicted in FIG. 13, the temperature at or on the surface of the solar panel 1302 is sensed by sensor 1303, and the sensed temperature is provided and/or communicated to the controller 1308. The controller 1308, based on the sensed temperature, transmits a control signal to the fan 1310 to control fan speed.

As noted above, the solar CHP design depicted in FIG. 13 can be combined with any of the solar harvesting systems detailed herein (D1-D8), and it should be noted that D1 is depicted in FIG. 13 simply for purposes of illustration.

As detailed herein, at least one embodiment of the invention includes implementing a combined photonic and heat harvesting design from a building envelope (that is, building-augmented solar systems). In accordance with one or more embodiments of the invention, photonic harvesting for significantly shaded structures (for example, solar parking lots) can include using highly reflective hollow tubes and/or planes with diffusive exits. Such an embodiment can include economically expanding available space for solar production (in constantly or partial shaded cases) and harnessing solar flux on building sides. Example embodiments including such implementations are illustrated in FIGS. 14-15.

Also, such embodiments of the invention include preserving the entire spectrum, and guiding, directing, and/or mixing the harvested photonic flux uniformly over a target commodity solar module/system, aiming for balanced solar production across a period of time (a day, for example) and lower fine-time-scale volatility of solar production. Auxiliary benefits of heat extraction from a building envelope include a reduced cooling load (incident solar radiation (direct and diffuse) that is absorbed contributes significantly to the cooling demand within a building) and the production of hot water for domestic consumption. For example, a solar heat flux from a building envelope can be used to produce hot water for meeting domestic hot water requirements, which can result in reduced electricity/gas demand, thus resulting in cost savings.

FIG. 14 is a diagram illustrating heat extraction from a building envelope, according to an example embodiment of the invention. By way of illustration, FIG. 14 depicts a building 1402 as well as a magnified side view that includes a photonic absorber 1404, a water supply component 1406 and a metal heat sink 1408. The implementation depicted in FIG. 14 illustrates forced convection from a heat sink 1408 to water, wherein hot water can be used, for example, for domestic hot water requirements. Additionally, while one building 1402 is shown in FIG. 14, multiple buildings, parking lots etc. can be used in an integrated network to result in a district heating system with distributed generation.

Features of solar CHP and heat extraction from a building envelope include modularity, wherein a heat extraction and/or CHP component can be an optional addendum to solar harvesting. Additionally, solar CHP and heat extraction from a building envelope allows a trade-off between electricity and heat production, producing solar harvesting with tunable reflectivity. Solar CHP and heat extraction from a building envelope can also encompass multiple embodiments (heat extraction from back/front using natural convection/forced convection, etc.) as well as an active system that provides shading and heat extraction from building envelopes.

As detailed herein, at least one embodiment of the invention includes solar harvesting and transportation with thermal shading. For example, FIG. 15A is a diagram illustrating (low-cost) thermal insulation and photonic and thermal harvesting at a building level, according to an example embodiment of the invention. By way of illustration, FIG. 15A depicts a building or structure 1502 (such as a parking lot, for example), one or more solar harvester components 1504 (such as D1-D8, for example), photonic routers 1506 (waveguides, etc.) and a PV 1508. In the example embodiment of the invention depicted in FIG. 15A, the photonic routers 1506 can include devices such as wave guides or advanced designs such as illustrated in FIG. 16. The implementation depicted in FIG. 15A provides thermal shading at a low cost compared to covering an entire roof with PVs. Such an implementation also generates a reduction in a cooling/HVAC load due to reduced solar influx on roofs, leading to lower energy consumption and costs. Harvesters 1504 can be places at various locations (ceiling, sides, awnings, etc.) and used to collect photons which are then routed to PVs 1508, which also results in heat harvesting, which can then be extracted in the form of hot water. Such hot water can be used, for example, for domestic hot water requirements, provide cooling via an absorption chiller, etc.

FIG. 15B is a diagram illustrating (low-cost) thermal insulation and photonic and thermal harvesting at a city level, according to an example embodiment of the invention. By way of illustration, FIG. 15B depicts a tunnel-like structure 1512, one or more solar harvester components 1504 (such as D1-D8, for example), photonic routers 1506 (waveguides, etc.) and a PV 1508. The implementation depicted in FIG. 15B illustrates thermal shades—tunnel like structures that can be created (in hot geographies, for example) which provide shading. Harvesters 1504 can be placed at roofs and/or sides of the structure 1512 and used to collect photons, which are then routed to PVs 1508 (which are not necessarily on the roofs), which generates high electrical throughput at a low cost. Also, such an embodiment results in heat harvesting, which is then extracted in the form of hot water, which can be used, for example, for domestic hot water requirements (for the city, to provide cooling inside the tunnel via an absorption chiller, etc.). In the example embodiment of the invention depicted in FIG. 15B, the photonic routers 1506 can include devices such as wave guides or advanced designs such as illustrated in FIG. 16.

FIG. 15C is a diagram illustrating (low-cost) thermal insulation and photonic harvesting in a water-bodies environment, according to an example embodiment of the invention. By way of illustration, FIG. 15C depicts a scaffolding structure 1522 (over a body of water, for example), one or more solar harvester components 1504 (such as D1-D8, for example), photonic routers 1506 (waveguides, etc.) and a PV 1508. The implementation depicted in FIG. 15C provides harvesters 1504 on top of the structure 1522 with the PV 1508 on at least one side of the structure 1522. Such an implementation provides for an efficient use of land for PV, as well as a reduction in evaporative losses. In the example embodiment of the invention depicted in FIG. 15C, the photonic routers 1506 can include devices such as wave guides or advanced designs such as illustrated in FIG. 16.

FIG. 15D is a diagram illustrating off-shore photonic harvesting, according to an example embodiment of the invention. By way of illustration, FIG. 15D depicts a structure 1532 positioned over a body of water, upon which are positioned photonic routers 1506 (waveguides, etc.) and one or more solar harvester components 1504 (such as D1-D8, for example). Harvesters 1504 can be placed on the structure 1532 and used to collect photons, which are then routed to PVs on land (not shown in FIG. 15D) via photonic routers 1506. In the example embodiment of the invention depicted in FIG. 15D, the photonic routers 1506 can include devices such as wave guides or advanced designs such as illustrated in FIG. 16.

FIG. 16 is a diagram illustrating example photonic routers implemented via light tubes, according to an example embodiment of the invention. By way of illustration, FIG. 16 depicts a light tube 1606 that includes concave mirrors 1607. The light tube 1606, as illustrated, can turn the direction of harvested light via the concave mirrors 1607 (en route to a PV) while minimizing the number of reflections needed. It should also be noted that in one or more embodiments of the invention, photonic routers such as depicted in FIG. 16, for example, can be used as building blocks to create a photonic network/grid for routing photons harvested in various locations.

With respect to the aspect of routing, at least one embodiment of the invention can include routing the photons reflected by one or more mirrors and/or harvesting designs to the photonic routers via mechanisms such as the focusing of light through mirrors (such as illustrated in FIG. 15A-15D) onto light tubes. Example light tubes, as noted above, are illustrated in FIG. 16.

In one or more other embodiments of the invention, the photons from a photonic router to a PV can be directed to the PV cells and/or portions using one or more mirror arrangements. Additionally, in one or more embodiments of the invention (such as building integrated embodiments, as detailed herein), collected and/or harvested light can be trapped via a physical phenomenon referred to as total internal reflection. Subsequent to collection and/or harvesting, an example such embodiment can include utilizing a hemispherical mirror to send the collected and/or harvested light to a light tube (as depicted, for example, in FIG. 16), which can subsequently guide and/or route the light to PV panels, wherein the light can emerge via a prismatic diffuser.

FIG. 17 is a diagram illustrating photonic harvesting and heat harvesting for agricultural applications, according to an example embodiment of the invention. By way of illustration, FIG. 17 depicts a scaffolding structure 1704, positioned over/on top of a greenhouse 1702, that hosts one or more PVs with solar harvester components 1706 (such as D1-D8, for example). Such an embodiment of the invention incorporates dual-use, namely, electricity generation and greenhouse maintenance. The greenhouse 1702, in this example, uses heat from the harvester-augmented PVs 1706.

FIG. 18 is a diagram illustrating photonic harvesting for solar chillers, according to an example embodiment of the invention. As used herein, solar chillers refer to systems that use solar energy to produce hot water, which can then be used to produce cooling using absorption chillers. By way of illustration, FIG. 18 depicts a solar collector 1802, macro-mirror 1804, macro-mirror 1806, and micro-mirrors 1805, 1807, 1809, 1811 and 1813. In such an implementation, harvesters are used to increase the thermal throughput of a solar collector set-up that produces hot water for absorption chillers. Additionally, the same advantages produced by designs D1-D8 apply to such an implementation for solar chiller application. Accordingly, while D3 is used for purposes of illustration in FIG. 18, it should be appreciated that such an implementation can be applied to any of D1-D8.

FIG. 19 is a diagram illustrating tracking mirrors and/or harvesters using a hydraulic apparatus, according to an example embodiment of the invention. By way of illustration, FIG. 19 depicts a solar panel (or solar collectors) 1902, mirrors 1904 and 1906, a controller 1908, and a hydraulic mechanism 1910 that changes harvester orientation for sun angle tracking. Such an implementation can be utilized, for example, with design D2, and can be used to increase throughput from both a PV and/or solar collectors for solar chiller applications.

Specifically, the embodiment of the invention depicted in FIG. 19 includes a controller 1908 which tunes the angle of the (macro) mirrors 1904 and 1906 so as to achieve target set-point values of output open circuit voltage and/or short circuit current. Additionally, as depicted, such an embodiment can incorporate a low cost mechanical (hydraulic) mechanism 1910.

FIG. 20 is a flow diagram illustrating techniques according to an embodiment of the present invention. Step 2002 includes determining one or more of multiple portions of a solar photovoltaic module that are underperforming in relation to one or more separate portions of the solar photovoltaic module, wherein said determining is carried out by a sensor device associated with the solar photovoltaic module. Determining can include monitoring each of the multiple portions of the solar photovoltaic module, monitoring a time-of-day parameter associated with the solar photovoltaic module, and/or monitoring a given voltage measurement of the solar photovoltaic module relative to an open circuit voltage parameter of the solar photovoltaic module. In such an embodiment of the invention, the open circuit voltage parameter of the solar photovoltaic module can include a target set-point value of output open circuit voltage.

Step 2004 includes configuring multiple reflective surfaces to produce a given configuration of the multiple reflective surfaces in relation to a surface of the solar photovoltaic module, wherein said configuring is carried out based on said determining the one or more underperforming portions of the solar photovoltaic module. Configuring the multiple reflective surfaces can include configuring each respective one of the one or more reflective surfaces individually. Also, configuring the multiple reflective surfaces can include configuring the multiple reflective surfaces collectively as a group. Additionally, the given configuration of the multiple reflective surfaces can include each respective one of the multiple reflective surfaces being maintained at a fixed angle in relation to the surface of the solar photovoltaic module.

Also, in at least one embodiment of the invention, the multiple reflective surfaces can include ten or more reflective surfaces. Increasing the number of embedded reflective surfaces, for example, by a factor of ten, may decrease the amount of solar radiation lost. One or more embodiments of the invention can also include implementing a coating of one or more of the reflective surfaces with a broad spectrum reflectance coating (such as a matte surface, for instance). If grated to have v-shaped indentations, reflections can be biased towards particular reflective surfaces. Additionally, one or more embodiments of the invention can include implementing a matte finish only a given portion (for example, the middle) of one or more reflective surfaces.

Step 2006 includes collecting (i) direct solar radiation and (ii) diffuse solar radiation incident on a plurality of the multiple reflective surfaces. Step 2008 includes distributing (i) the collected direct solar radiation and (ii) the collected diffuse solar radiation across the multiple portions of the solar photovoltaic module in a targeted manner based on the given configuration of the multiple reflective surfaces to offset the one or more underperforming portions of the solar photovoltaic module by a given amount, wherein said distributing comprises reflecting (i) the collected direct solar radiation and (ii) the collected diffuse solar radiation off of one or more of the multiple reflective surfaces to the multiple portions of the solar photovoltaic module of the solar photovoltaic module in accordance with the given configuration of the multiple reflective surfaces.

Distributing in a targeted manner can include distributing (i) the collected direct solar radiation and (ii) the collected diffuse solar radiation uniformly across the multiple portions of the solar photovoltaic module.

In at least one embodiment of the invention, the given amount (of the above-noted offset) can include a predetermined percentage of production of the highest-producing portion of the solar photovoltaic module. Further, in one or more embodiments of the invention, a portion (for example, one half) of at least one reflective surface (such as, for example, an end mirror) can be implemented with a matte finish. Another embodiment of the invention can include implementing at least one prismatic diffusive layer above the PV module, but below the reflective surfaces.

The techniques depicted in FIG. 20 can also include reconfiguring one or more of the multiple reflective surfaces based on (i) said distributing and (ii) one or more sensing parameters.

Also, an additional embodiment of the invention includes an apparatus that includes a solar photovoltaic module, and a sensor device operative to determine one or more of multiple portions of the solar photovoltaic module that are underperforming in relation to one or more separate portions of the solar photovoltaic module. The apparatus can also include one or more reflective surfaces of a first type, wherein each respective one of the one or more reflective surfaces of the first type is physically connected to the solar photovoltaic module at a given angle in relation to the surface of the solar photovoltaic module; and one or more reflective surfaces of a second type, wherein each respective one of the one or more reflective surfaces of the second type is physically connected to a respective one of the one or more reflective surfaces of the first type; wherein (i) the one or more reflective surfaces of the first type and (ii) the one or more reflective surfaces of the second type are configurable based on a determination of the one or more underperforming portions of the solar photovoltaic module to: collect direct solar radiation and diffuse solar radiation; and distribute the collected direct solar radiation and the collected diffuse solar radiation across the multiple portions of the solar photovoltaic module in a targeted manner to offset the one or more underperforming portions of the solar photovoltaic module by a given amount.

In such an apparatus, each respective one of the reflective surfaces of the first type is of a greater length than each respective one of the reflective surfaces of the second type. Also, each respective one of the one or more reflective surfaces of the first type can include one of (i) a flat reflective surface and (ii) a concave reflective surface. Similarly, each respective one of the one or more reflective surfaces of the second type comprises one of (i) a flat reflective surface and (ii) a concave reflective surface.

Such an apparatus can also include one or more reflective surfaces of a third type, wherein each respective one of the one or more reflective surfaces of the third type is physically connected to a respective one of the one or more reflective surfaces of the first type. In one or more embodiments of the invention, each respective one of the one or more reflective surfaces of the third type can include one of (i) a flat reflective surface and (ii) a concave reflective surface. Additionally, such an apparatus can also include one or more lenses, wherein each respective one of the one or more lenses is physically connected to a respective one of the one or more reflective surfaces of the second type.

Further, an apparatus such as detailed above can also include a hydraulic mechanism coupled to a controller, wherein said controller includes at least a memory and a processor coupled to the memory, and wherein the controller provides instructions to the hydraulic mechanism to configure (i) the one or more reflective surfaces of the first type and/or (ii) the one or more reflective surfaces of the second type. Accordingly, one or more embodiments of the invention can include implementing a hydraulic mechanism to tilt the apparatus as a function of time-of-day, a function of voltage measurements (V) relative to $V_{oc}$ (open circuit voltage parameter of the PV module), etc., to ensure that the PV module is not over-exposed, for example. By way of illustration, if $V \ll V_{oc}$, it is indicative of sub-optimal production by the PV module (and that the PV module can take further photonic load (for example, because of the presence of clouds). Similarly, in one or more embodiments of the invention, when V is close in value to $V_{oc}$, then the controller can choose not to over-expose the PV module, and can reduce the amount of harvesting incident on the PV module (or keep the configuration unchanged).

Also, an additional aspect of the invention includes a system that includes a solar photovoltaic module; and a sensor device operative to determine one or more of multiple portions of the solar photovoltaic module that are underperforming in relation to one or more separate portions of the solar photovoltaic module. The system can also include a plurality of configurable reflective surfaces, wherein: each respective one of the plurality of configurable reflective surfaces is physically connected to the solar photovoltaic module at a given angle in relation to the surface of the solar photovoltaic module; and each respective one of the plurality of configurable reflective surfaces is configurable based on a determination of the one or more underperforming portions of the solar photovoltaic module to (i) collect direct solar radiation and diffuse solar radiation and (ii) distribute the collected direct solar radiation and the collected diffuse solar radiation across the multiple portions of the solar photovoltaic module in a targeted manner to offset the one or more underperforming portions of the solar photovoltaic module by a given amount. The system can also include a heat transfer mechanism coupled to the solar photovoltaic module and operative to reduce the temperature of the solar photovoltaic module.

In at least one embodiment of the invention, the heat transfer mechanism can include a forced convection mechanism that includes a temperature sensor coupled to the solar photovoltaic module, one or more fans, and a controller, wherein said controller comprises at least a memory and a processor coupled to the memory. With respect to such a mechanism, the temperature sensor senses the temperature at or on a surface of the solar photovoltaic module and communicates the sensed temperature to the controller. Also, the controller, based on the sensed temperature, transmits a control signal to the one or more fans to control fan speed of the one or more fans. Further, the one or more fans are operable to reduce the temperature of the solar photovoltaic module in accordance with the control signal transmitted from the controller.

Also, in at least one embodiment of the invention, the heat transfer mechanism can include a forced convection mechanism that includes a pump, wherein the pump circulates water in a given proximity of the solar photovoltaic module.

The techniques depicted in FIG. 20 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 20 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps. An example of such an apparatus is depicted in FIG. 21 and further described below. Additionally, such an apparatus (such as data processing unit 2112 illustrated in FIG. 21) can be encompassed and/or incorporated via one or more embodiments of the invention detailed herein. For example, in FIG. 12, such an apparatus can be incorporated in the tunable reflectivity mirrors (1204 and 1206) and implemented for setting the reflectivity based on a desired tradeoff between electricity and hot water, for instance. In another example, such an apparatus can be incorporated in control systems (such as detailed, for instance, in FIG. 10B, FIG. 12, FIG. 15A, FIG. 15B, and FIG. 18) and implemented to adjust the flow rate of the heat extracting water based on a desired water set-point temperature. In yet another example, such an apparatus can be incorporated in a controller (such as depicted in FIG. 13 and/or FIG. 19, for instance) and implemented for actuating a hydraulic actuator. In addition, in one or more embodiments of the invention, such an apparatus (such as data processing unit 2112 illustrated in FIG. 21) can be incorporated locally (as an embedded system for measurement and/or control, for instance) and/or remotely (in an operations center connected via an interface, for instance).

Additionally, an aspect of the present invention can make use of software running on a computer or workstation. With reference to FIG. 21, such an implementation might employ, for example, a processor 2102, a memory 2104, and an input/output interface formed, for example, by a display 2106 and a keyboard 2108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 2102, memory 2104, and input/output interface such as display 2106 and keyboard 2108 can be interconnected, for example, via bus 2110 as part of a data processing unit 2112. Suitable interconnections, for example via bus 2110, can also be provided to a network interface 2114, such as a network card, which can be provided to interface with a computer network, and to a media interface 2116, such as a diskette or CD-ROM drive, which can be provided to interface with media 2118.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 2102 coupled directly or indirectly to memory elements 2104 through a system bus 2110. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 2108, displays 2106, pointing devices, and the like) can be coupled to the system either directly (such as via bus 2110) or through intervening I/O controllers (omitted for clarity).

Network adapters such as network interface 2114 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 2112 as shown in FIG. 21) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 2102. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one aspect of the present invention may provide a beneficial effect such as, for example, minimizing shadowing and soiling effects by collecting, with optics, a broad spectrum of light with reduced attenuation at different times of day to maximize PV generation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
 a solar photovoltaic module;
 a sensor device operative to determine one or more of multiple portions of the solar photovoltaic module that are underperforming in relation to one or more separate portions of the solar photovoltaic module;
 one or more reflective surfaces of a first type, wherein each respective one of the one or more reflective surfaces of the first type is physically connected to the solar photovoltaic module at a given angle in relation to the surface of the solar photovoltaic module, and wherein the first type comprises a flat reflective surface; and
 one or more reflective surfaces of a second type, wherein each respective one of the one or more reflective surfaces of the second type is physically connected to a portion of the one or more reflective surfaces of the first type, and wherein the second type comprises a concave reflective surface;
 one or more items of rectangular transparent glass, wherein each respective one of the one or more items of rectangular transparent glass is physically connected to a respective one of the one or more reflective surfaces of the second type;
 one or more reflective lenses, wherein each respective one of the one or more reflective lenses is physically connected to a respective one of the one or more items of rectangular transparent glass;
 wherein (i) the one or more reflective surfaces of the first type, (ii) the one or more reflective surfaces of the second type, and (iii) the one or more reflective lenses are configurable based on a determination of the one or more underperforming portions of the solar photovoltaic module to:
  collect direct solar radiation and diffuse solar radiation; and
  distribute the collected direct solar radiation and the collected diffuse solar radiation across the multiple portions of the solar photovoltaic module in a targeted manner to offset the one or more underperforming portions of the solar photovoltaic module by a given amount.

2. The apparatus of claim 1, comprising:
 one or more reflective surfaces of a third type, wherein each respective one of the one or more reflective surfaces of the third type is physically connected to a respective one of the one or more reflective surfaces of the first type.

3. The apparatus of claim 1, wherein each respective one of the one or more reflective surfaces of the first type is of a greater length than each respective one of the one or more reflective surfaces of the second type.

4. The apparatus of claim 1, comprising:

a hydraulic mechanism coupled to a controller, wherein said controller comprises at least a memory and a processor coupled to the memory, and wherein the controller provides instructions to the hydraulic mechanism to configure the one or more reflective surfaces of the first type.

5. The apparatus of claim 1, comprising:

a hydraulic mechanism coupled to a controller, wherein said controller comprises at least a memory and a processor coupled to the memory, and wherein the controller provides instructions to the hydraulic mechanism to configure the one or more reflective surfaces of the second type.

6. The apparatus of claim 1, wherein the given amount comprises a predetermined percentage of production of the highest-producing portion of the solar photovoltaic module.

7. The apparatus of claim 1, wherein the given angle comprises a fixed angle in relation to the surface of the solar photovoltaic module.

8. The apparatus of claim 1, wherein said distributing in a targeted manner comprises distributing (i) the collected direct solar radiation and (ii) the collected diffuse solar radiation uniformly across the multiple portions of the solar photovoltaic module.

9. The apparatus of claim 1, wherein the one or more reflective surfaces of a first type comprise ten or more reflective surfaces of the first type.

10. The apparatus of claim 1, wherein the one or more reflective surfaces of a second type comprise ten or more reflective surfaces of the second type.

* * * * *